United States Patent
Bonnefous

(10) Patent No.: US 10,450,862 B2
(45) Date of Patent: Oct. 22, 2019

(54) TWO-STROKE INTERNAL COMBUSTION ENGINE WITH A SPHERICAL CHAMBER

(71) Applicant: Edouard Bonnefous, Saint-Mande (FR)

(72) Inventor: Edouard Bonnefous, Saint-Mande (FR)

( * ) Notice: Subject to any disclaimer, the term of this patent is extended or adjusted under 35 U.S.C. 154(b) by 650 days.

(21) Appl. No.: 14/902,621

(22) PCT Filed: Jul. 2, 2014

(86) PCT No.: PCT/IB2014/062804
§ 371 (c)(1),
(2) Date: Jan. 4, 2016

(87) PCT Pub. No.: WO2015/001503
PCT Pub. Date: Jan. 8, 2015

(65) Prior Publication Data
US 2016/0177720 A1    Jun. 23, 2016

(30) Foreign Application Priority Data
Jul. 4, 2013  (FR) ..................... 13/01584

(51) Int. Cl.
| | |
|---|---|
| *F01B 9/02* | (2006.01) |
| *F01C 9/00* | (2006.01) |
| *F01C 17/02* | (2006.01) |
| *F02B 75/36* | (2006.01) |
| *F01L 1/344* | (2006.01) |

(Continued)

(52) U.S. Cl.
CPC .................. *F01B 9/02* (2013.01); *F01C 9/00* (2013.01); *F01C 17/02* (2013.01); *F01L 1/344* (2013.01); *F02B 1/04* (2013.01); *F02B 1/12* (2013.01); *F02B 75/02* (2013.01); *F02B 75/36* (2013.01); *F01C 19/00* (2013.01); *F04C 2250/00* (2013.01); *Y02T 10/142* (2013.01); *Y02T 10/17* (2013.01)

(58) Field of Classification Search
CPC .... F01B 9/02; F01C 9/00; F01C 17/02; F01C 19/00
See application file for complete search history.

(56) References Cited

U.S. PATENT DOCUMENTS

| | | |
|---|---|---|
| 4,802,449 A | 2/1989 | Yang |
| 5,012,769 A | 5/1991 | Cottingham |
| 2008/0087237 A1 | 4/2008 | Dick et al. |

OTHER PUBLICATIONS

International Search Report, dated Oct. 22, 2014, from corresponding PCT application.

*Primary Examiner* — Ngoc T Nguyen
(74) *Attorney, Agent, or Firm* — Young & Thompson

(57) ABSTRACT

An internal combustion heat engine, of which the architecture of one elementary "cylinder" includes 4 identical mobile couplings distributed about the Z axis of the engine, consisting of a segmented "piston" driven by the crank pin of a crankshaft and guided by a roller rolling in a slide. The crankshafts, which are parallel and synchronized by a gear mechanism, perform one revolution per cycle. Each piston includes a sliding surface that nearly touches the cylinder face of the adjacent piston, but on which the segmentation slides in sealed contact. The concave shape of the 4 overlapping faces encloses a chamber volume that changes cyclically: at a minimum, having a quasi-spherical shape during combustion, reducing the heat losses at the walls, and at a maximum, uncovering the ports allowing intake and exhaust via transfer units and manifolds with the possibility of more economical Miller/Atkinson distribution, via rotary plates.

23 Claims, 24 Drawing Sheets

(51) Int. Cl.
*F02B 1/04* (2006.01)
*F02B 1/12* (2006.01)
*F02B 75/02* (2006.01)
*F01C 19/00* (2006.01)

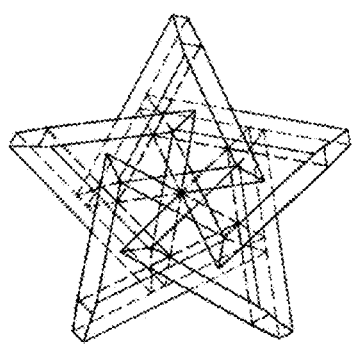
Fig. 4a
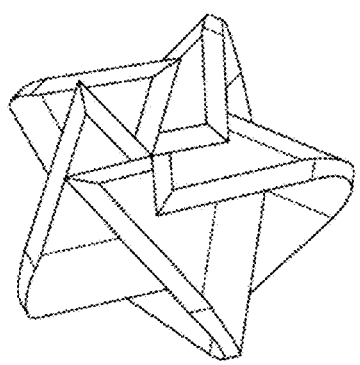
Fig. 4b
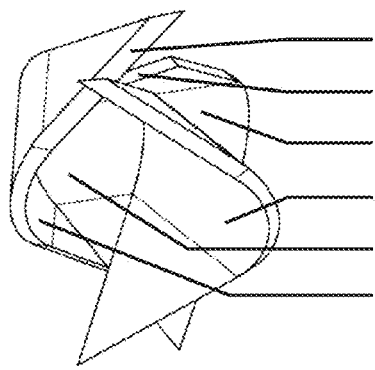
52a
52b
51b
51c
35
51a
Fig. 4c
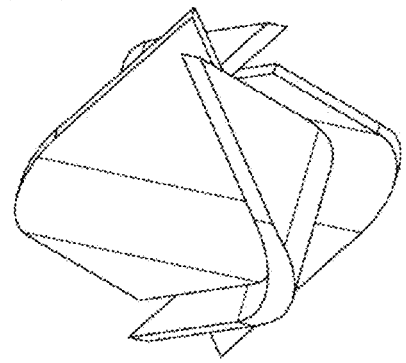
Fig. 4d
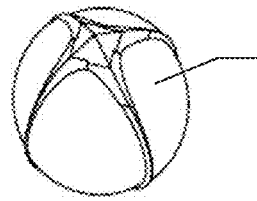
55
Fig. 5a (0°)
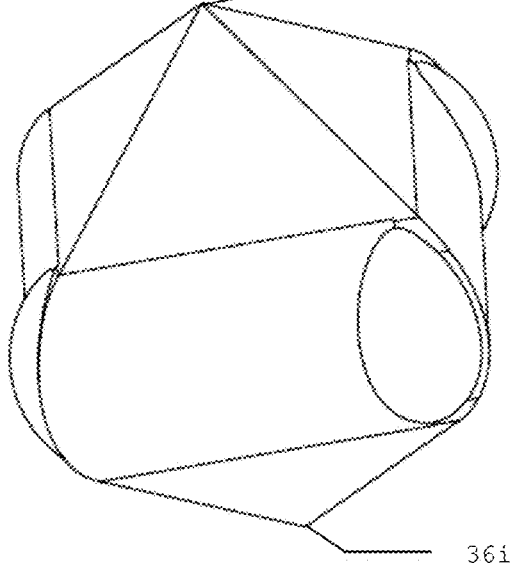
36s
36i
Fig. 5b (90°)　　Fig. 5c (180°)

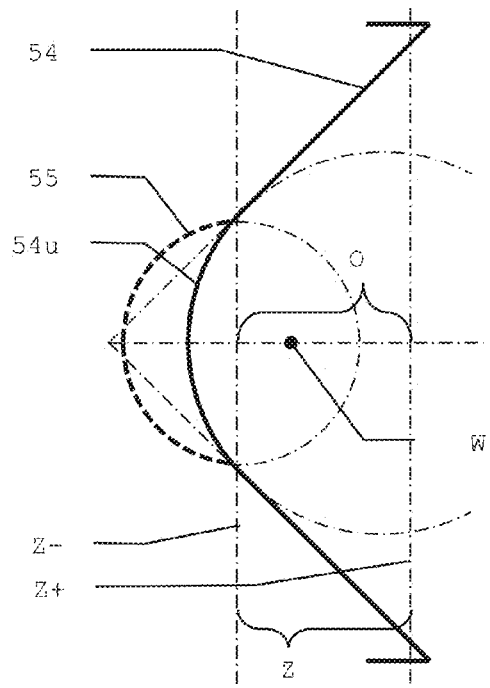
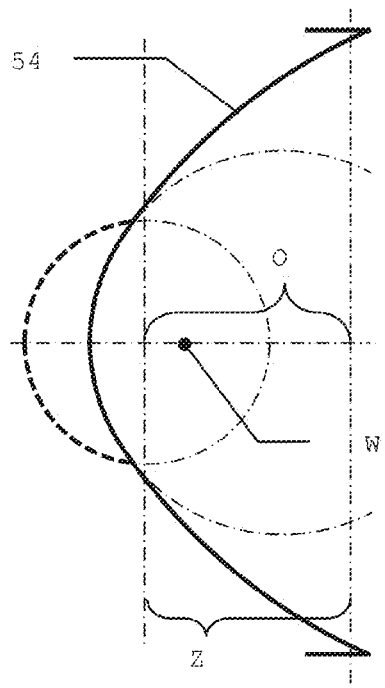
Fig. 8a    Fig. 8b
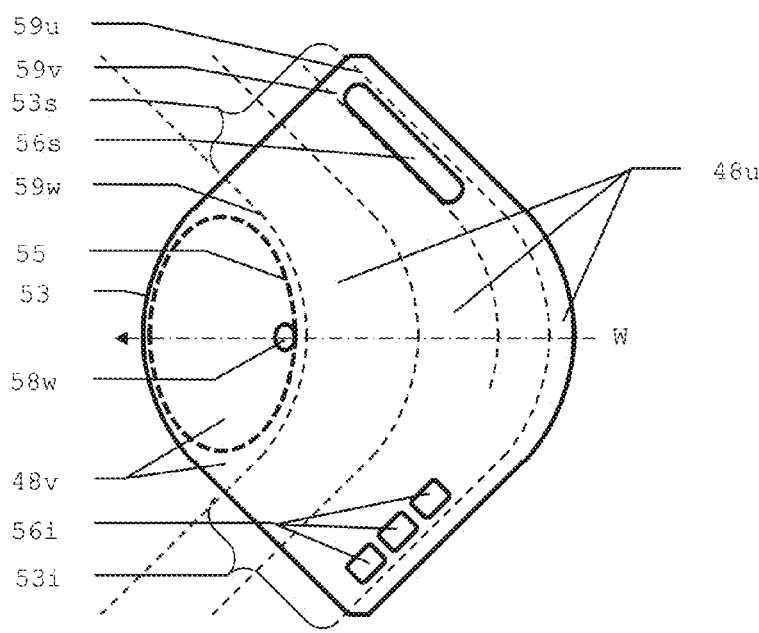
Fig. 9

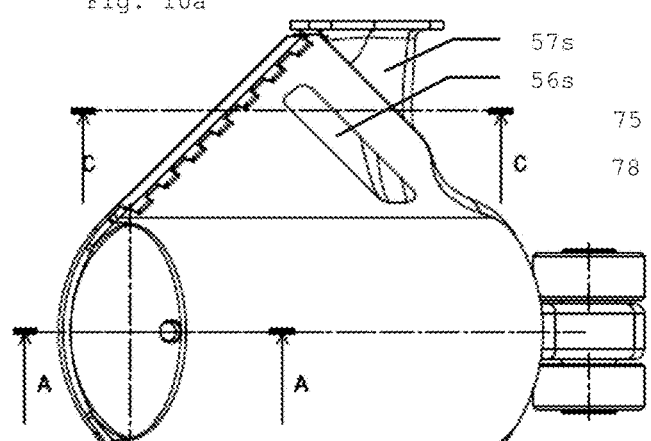
Fig. 10a
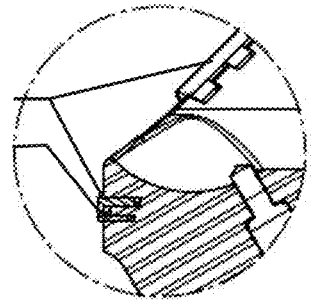
Cut A-A
Fig. 10b
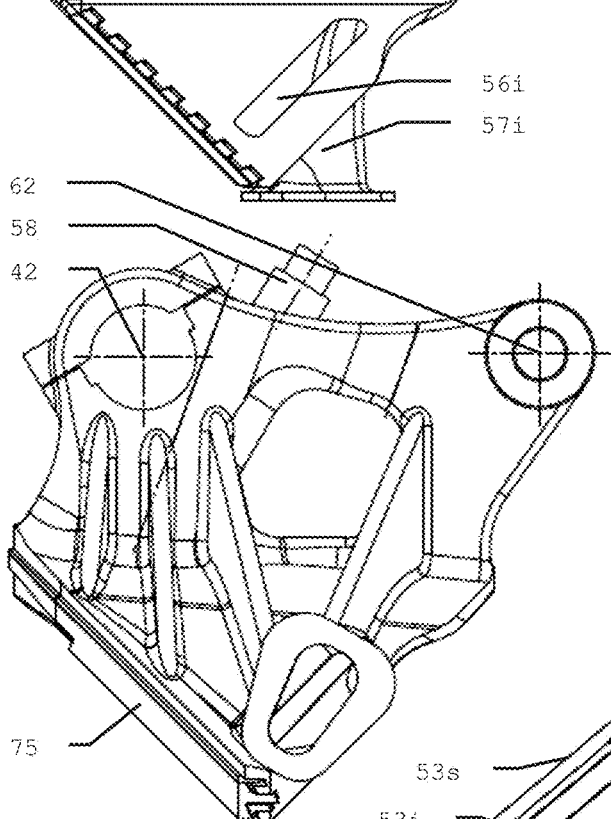
Fig. 10e
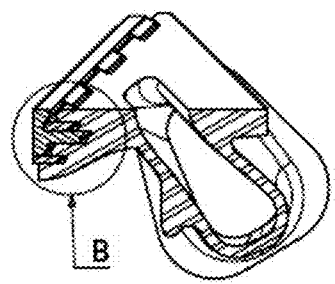
Cut C-C
Fig. 10c
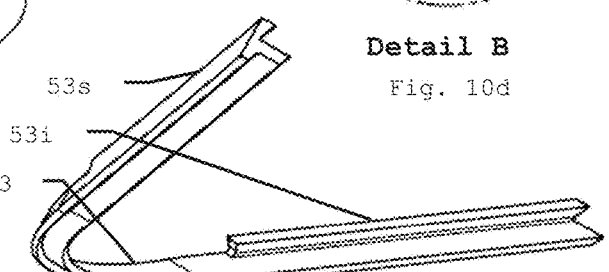
Detail B
Fig. 10d
Fig. 10f

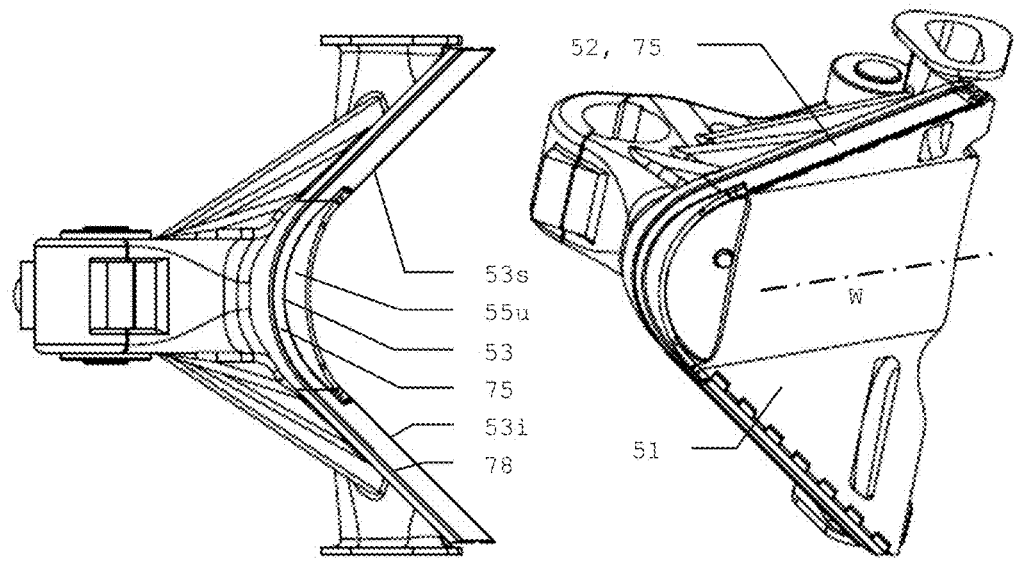
Fig. 11a  Fig. 11b
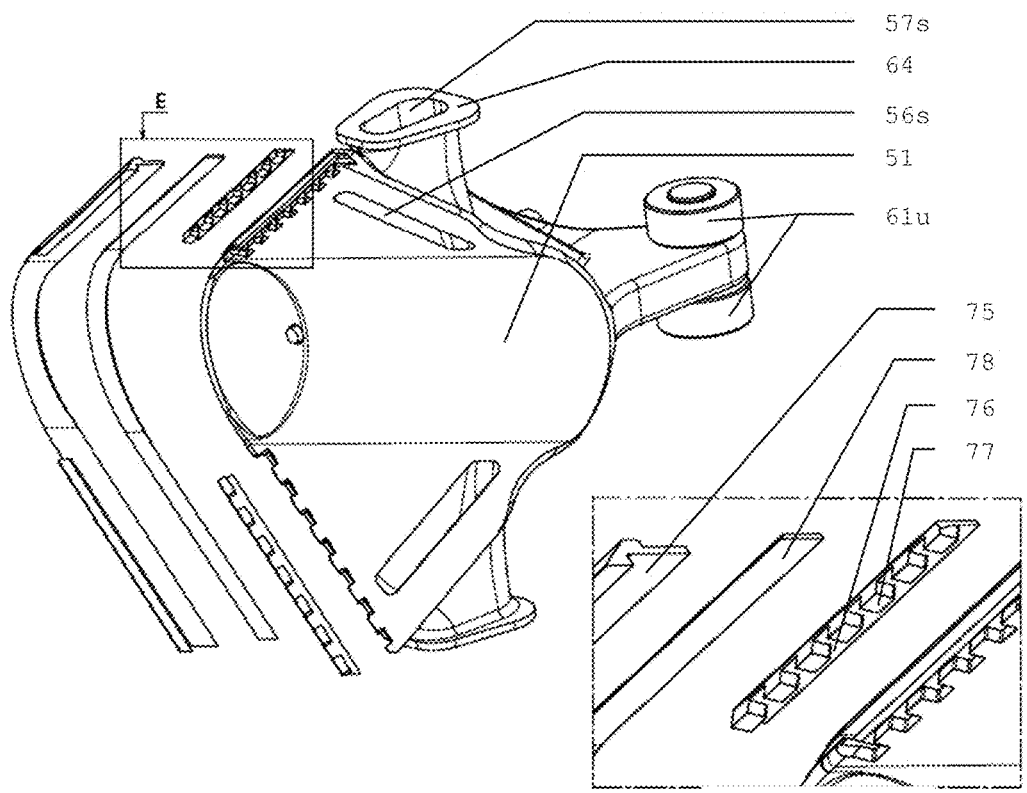
Fig. 11c  Detail E

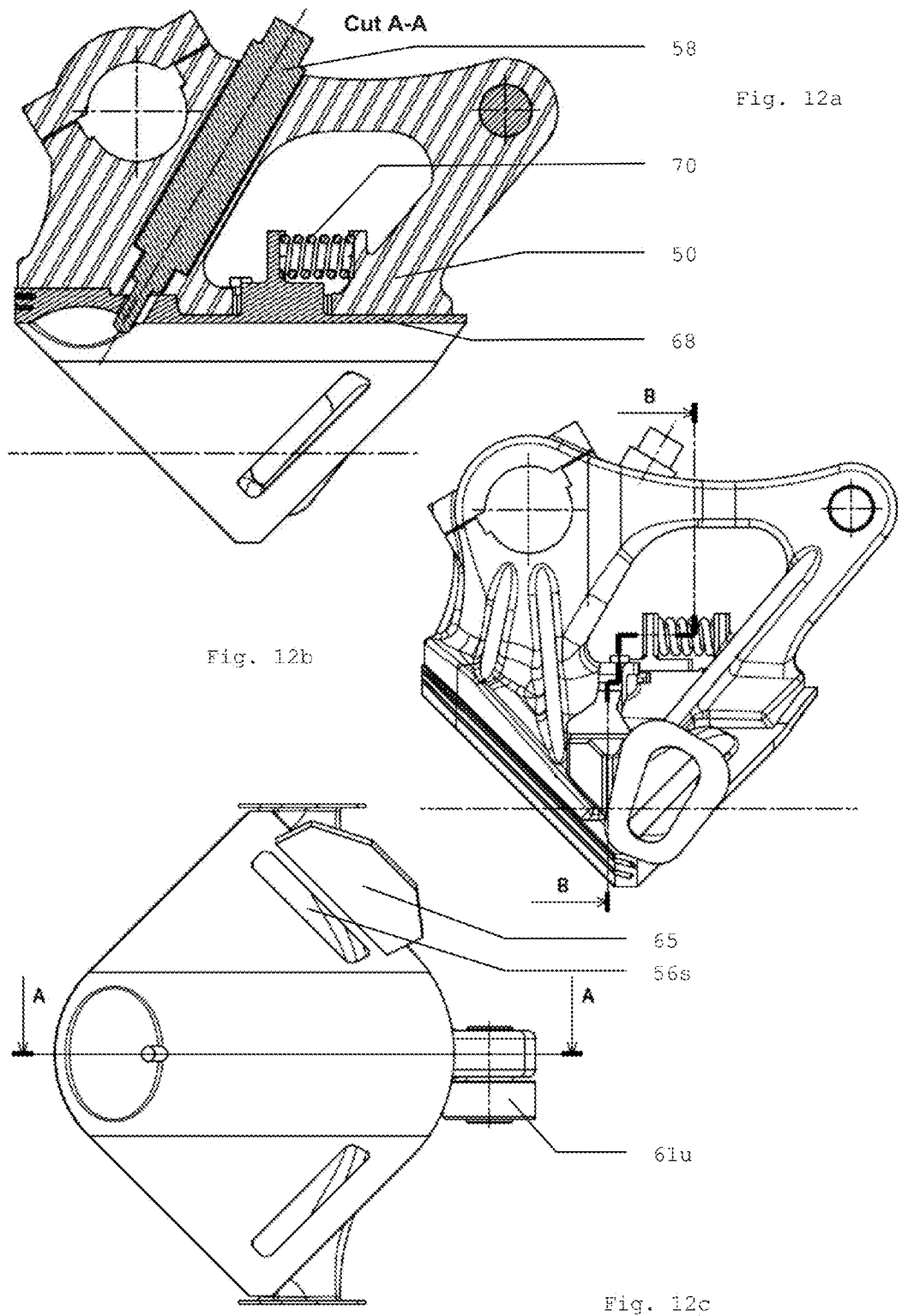

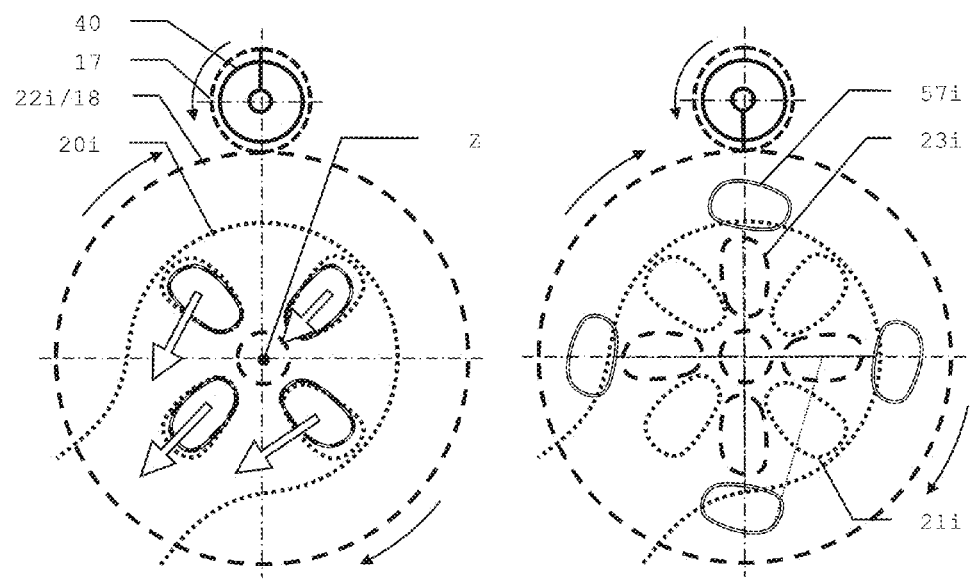
Fig. 15a (180°)   Fig. 15b (0°)
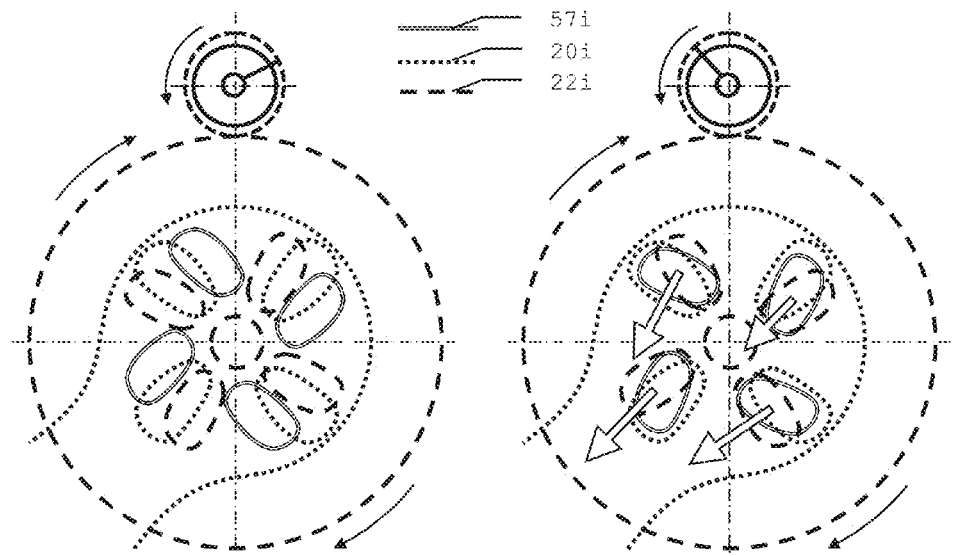
Fig. 15c (120°)   Fig. 15d (220°)

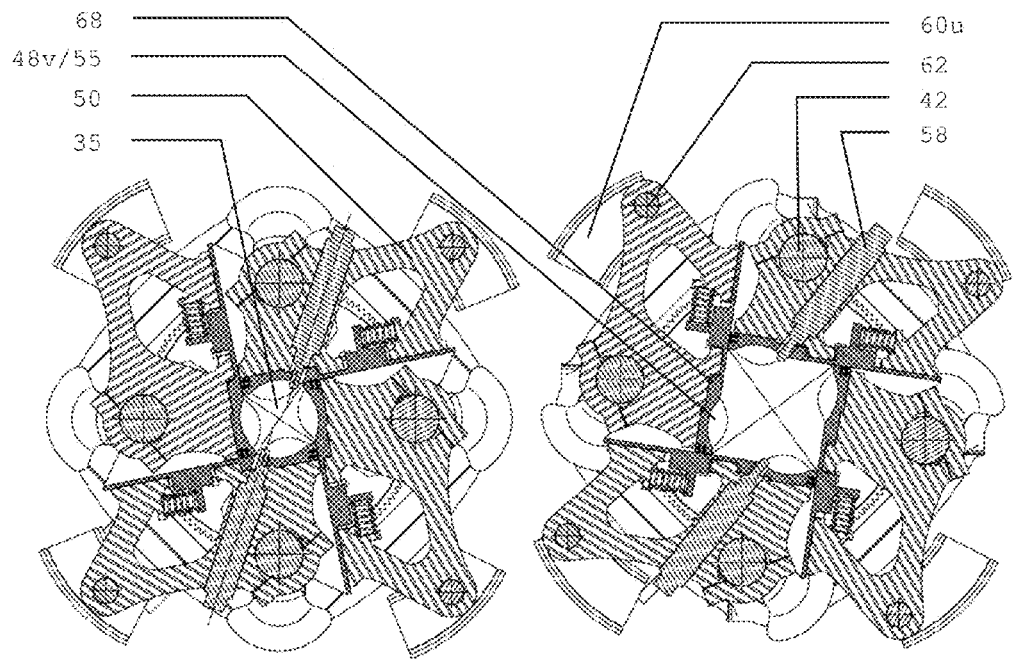
Fig. 18a (0°)　　　　Fig. 18b (60°)
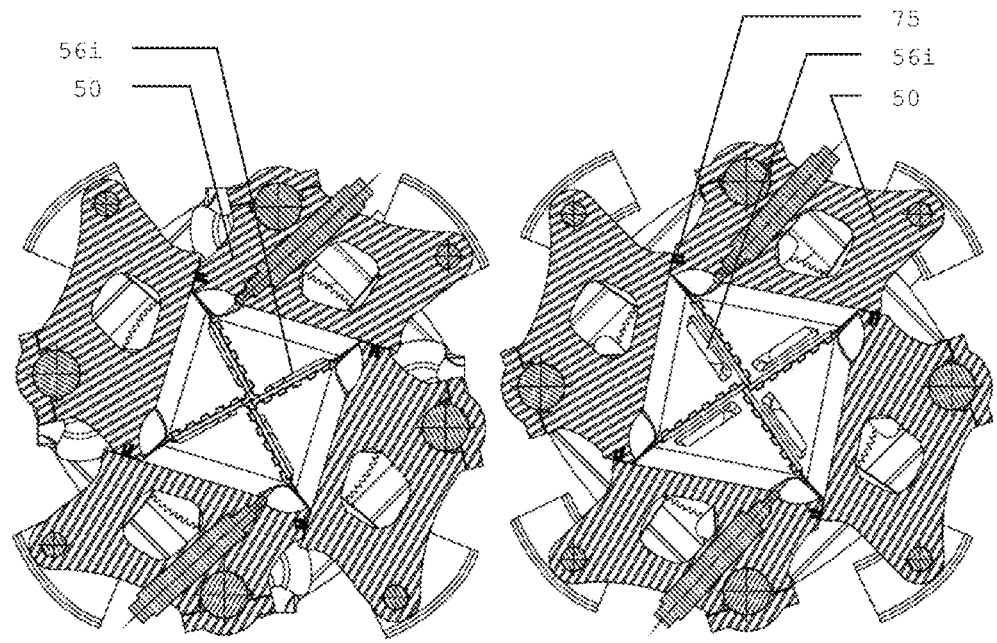
Fig. 18c (130°)　　　　Fig. 18d (180°)

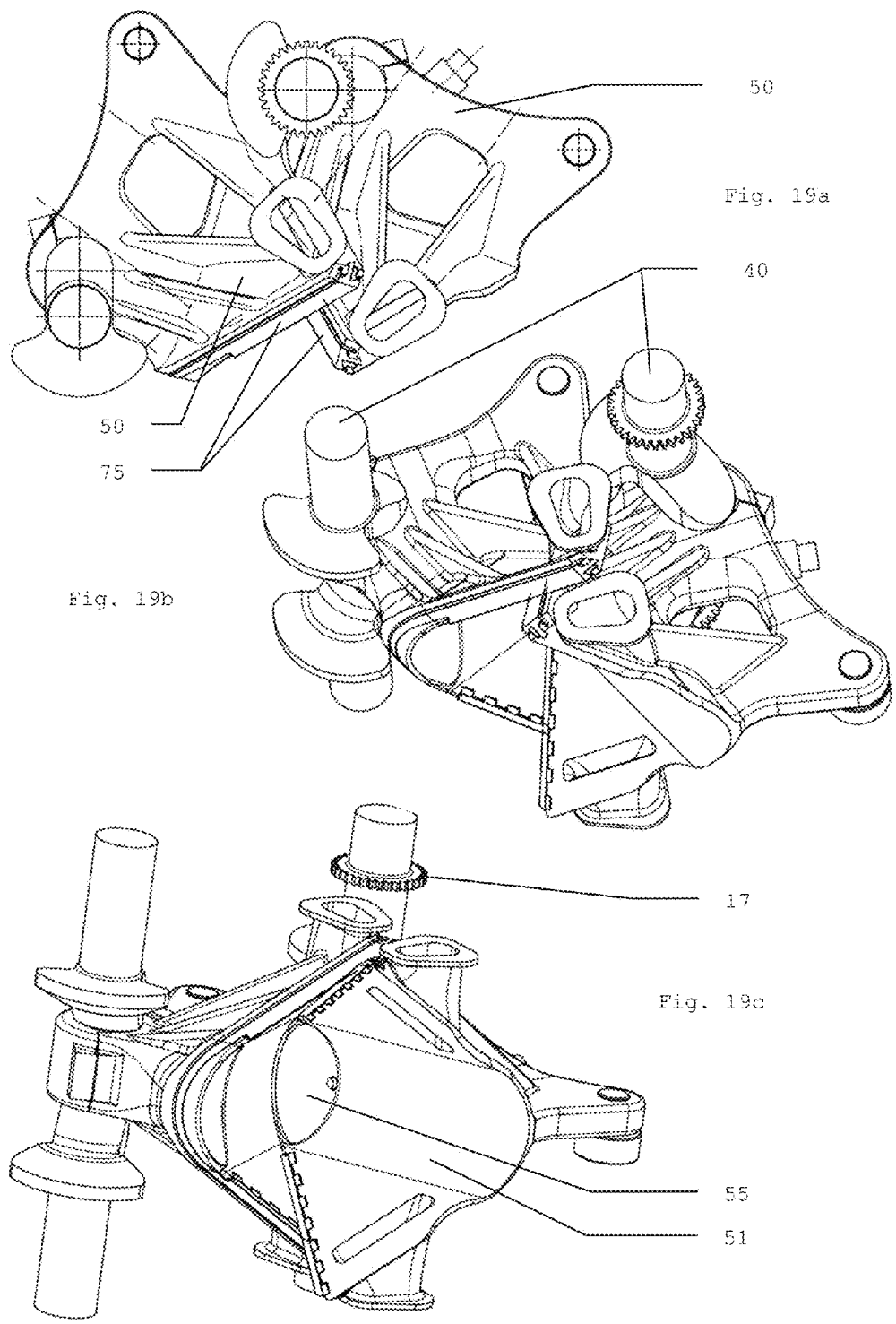

TWO-STROKE INTERNAL COMBUSTION ENGINE WITH A SPHERICAL CHAMBER

The present invention concerns the kinematic architecture and arrangement of an alternating, internal combustion heat engine.

STATE OF THE ART AND IMPROVEMENTS TO THE INVENTION

The majority of internal combustion heat engines have a combustion and working fluid chamber whose volume varies with the alternating motion of a piston in a cylinder. One rare exception that has been industrially proven is the rotating-piston Wankel engine.

The state of the art acknowledges other heat engine architectures having a non-conventional combustion chamber, i.e. one that does not consist of a cylindrical piston that translates inside a rather compact cylinder and chamber, as described in the following patents:
  U.S. Pat. No. 5,012,769 A dated 7 May 1991 (Cottingham Brent R [US])
  U.S. Pat. No. 4,802,449 A dated 7 Feb. 1989 (Yang Ping [US])
  US 2008/087237 A1 dated 17 Apr. 2008 (Dick Timber [US])

Volume—Surface Ratio
/Thermal Losses

The combustion chamber at the Top Dead Center (TDC) of this type of standard piston-cylinder arrangement has an increased ratio of wall surface to chamber volume, in comparison to the minimum possible geometric offered by the sphere, namely around half, without taking into consideration any recesses or bowling in the pistons that would increase this ratio even more.

Thermal losses from the walls of the combustion chamber and cylinder, for a standard internal combustion heat engine, represent around one-third of the calorific value of the fuel (for an "automobile" unit cylinder of around 500 cm$^3$). Because of this, decreasing this surface, all other things being equal, would make it possible to decrease the thermal losses in the walls and therefore improve the efficiency of the motor. The best of the state of the art on this point is achieved by opposing-piston (two-stroke) diesel engines, by decreasing the surface/volume ratio of the combustion chamber.

/Pressure Forces

A standard moving piston-slider-crank assembly is dimensioned, among other things, according to the inertial forces associated with the maximum speed and according to the maximum cylinder head pressure forces encountered. This cylinder head pressure force is directly proportional to the projected surface of the piston, depending on the cylinder axis or, in the same way, the square of the piston diameter. It is these inertia and pressure forces that set, in approximate proportion with the stroke and in part the mass of the moving assembly and also in part the mass of the cylinder head, of the housing, cylinders and engine bottom.

This way, decreasing this projected surface of the piston, with all other things being equal, would make it possible to decrease the pressure forces and therefore to decrease the mass of the moving assembly and of a significant part of the motor.

The engine according to the invention, due to the quasi-spherical shape of its combustion chamber at the TDC, improves these two preceding points. Effectively, at a given volume, the surface of the walls of the chamber at the TDC and in the vicinity of the TDC is lower, around half of the TDC:

This decreases thermal losses in the walls as compression ends, during the combustion/explosion process and during expansion, which increases the efficiency of the motor.

This decreases the sum total of forces engendered by pressure on the chamber walls, as compared to the pressure force on a standard cylinder head plus that of a standard piston. This decrease is in fact present even if the chamber is formed by the walls of 3, 5 or ideally 4 faces of the piston. Since it is associated with a shorter moving part at a given piston volume, it tends to reduce the weight of the working structural parts of the motor and therefore tends to reduce the weight of the entire engine.

Miller-Atkinson Cycle Distribution Diagram

The Miller-Atkinson cycle is sometimes implemented in 4-stroke engines to improve their overall efficiency. This is achieved depending on the engine: through a delayed intake closure after the Bottom Dead Center (BDC) by allowing the gas that was just taken in, to retreat, or through an advance intake closure before the Bottom Dead Center (BDC) by limiting the gas intake, thus creating, in both cases, a compression stroke that is effectively weaker than the effective expansion stroke, which makes it possible to make the gases work more at the end of the expansion stage, due to their even greater end-of-expansion pressure (except during slowdown or if the load is very low), thus improving efficiency.

For standard single-piston two-stroke engines, the Miller-Atkinson cycle cannot be implemented because, for a standard scan configuration, the intake and exhaust apertures are fixed, which always imposes an expansion stroke that is less than or equal to the compression stroke. Also, because exhaust starts after intake. This is also true that for the unidirectional or equicurrent 2-stroke scan: aperture or valve mono-piston or even for configurations with opposing pistons.

The engine according to the invention, preferably in its 2-stroke version, implements the Miller-Atkinson cycle through its "staged" distribution. In fact, the intake channels, like the exhaust channels, have two parts in opening/closing series, namely the apertures of the chamber, then the aperture plate. This way, unlike a standard 2-stroke engine, an optimized, asymmetrical distribution diagram can be implemented:

Delayed exhaust opening, always before the BDC
  Larger angle between exhaust opening and intake opening, to allow the gas pressure in the chamber sufficient time to decrease and be less than the intake pressure.
  Lower angle between intake and exhaust openings, in one direction or the other
  Complete closure (intake and exhaust) delayed, long after the BDC, in order to implement the Miller-Atkinson cycle, i.e. achieve an effective expansion stroke that is greater than the effective compression stroke.

Example

| Angles (BDC = 180°) | Standard 2-stroke | 2-stroke according to the invention |
|---|---|---|
| Exhaust Opening | 120° | 140° |
| Intake Opening | 140° | 170° |
| Intake Closing | 220° | 240° |
| Exhaust Closing | 240° | 220° |

Equicurrent or Unidirectional Scan

In general, standard single two-stroke engines, with pistons and apertures equipped with a perfectible scan, where the proportion of mixed fresh and burned gases can be significant. Opposite-piston two-stroke engines have opposing intake and exhaust apertures at each end of the cylinder, enabling a unidirectional or equicurrent scan.

The engine according to the invention, through its apertures located in the chamber caps, the intake at a cap and the exhaust at the opposite cap, implements this type of unidirectional or equicurrent scan of fresh and burned gases.

Piston Friction

Friction in the moving piston slider crank assembly in a standard engine is significant. In particular, when expansion begins, the obliqueness of the slider crank presses the piston forcefully against the cylinder, when it is in motion, thus generating friction. Also, the bearings of the crankshaft and the slider crank are subject to friction, even when lubricated.

The engine according to the preferred invention includes four (4) moving connections, each of which drives the piston by a crankshaft and a slider-pivot, i.e. a guided-piston kinematic. There is no more obliqueness of the slider crank as there is in the prior art. This friction associated with the lateral thrust of the piston is therefore greatly decreased, even if substituted by the sliding of a shoe or the rolling of a roller in the slider, but whose force is lower. In fact, in the invention, two adjacent pistons constantly skim past each other without touching, and therefore without friction. These are the segments that rub together to ensure leakproofness.

Laser Lighting

To initiate the explosion, controlled lighting engines use spark plugs that cause an electric arc. The frame front leaves the spark of the spark plug and propagates in the chamber by transmitting a portion of its heat to the walls. The best combustion efficiency is obtained when:

The travel time for the flame front is minimal, in other words, independently of the turbulence, a small or compact chamber is required, ideally a spherical one.

The transfer to the walls of the heat of the flame front is delayed. Ideally the delay is achieved in a spherical combustion chamber whose ignition point is in the center.

In a spherical combustion chamber, as in the engine according to the invention, a spark plug would necessarily have to be placed at the edge of the sphere and not in the center, so that it could be cooled and not have any hot points.

Laboratory studies have been done that implemented ignition by laser ray. Laser lighting makes it possible to ignite in the center of the sphere, by focusing of laser rays.

It is, therefore, in a spherical combustion chamber, like that of the engine according to the invention, that laser ignition, a laser focused noticeably in the center of the chamber, offers the greatest potential.

Also, the laser source could be located on the fixed chassis assembly and not on the moving piston assembly, avoiding the need for flexible electric power cables from the laser source. The piston assembly has a focusing optic of which one face is apparent on the piston face in the chamber at TDC, and the other face visible on the exterior of the piston assembly and which receives the laser ray at the appropriate moment in the cycle.

Isochoric [Constant Volume] Nature of the Law of Volume

The maximum speed of a standard diesel engine is limited by the fuel combustion time, a time that is specified, at a given speed, by the law of volume of the piston-slider-crank kinematic.

The engine according to the invention shows a law of volume that is more fixed volume at the TDC, relative to a standard slider crank-crank arm kinematic of identical cylinder volume and volumetric ratio, which, for an engine according to the invention, with ignition by compression, enables rotation at a higher rate than the standard engine, while at the same time leaving fuel to be injected, vaporized and burned.

Adaptation of Speeds Between Engine and Load

The adaptation of the range of speed of the engine to the load to be driven, very often requires the use of at least one reducer or multiplier. This latter may be compact and light, when it is, for example, an epicycloidal train, but generally involves a wheel-pinion gearing couple, a technical solution that is simple, but heavy and bulky, because all the power passes through a single gearing point/line.

Adapting the range of speed of the engine according to the invention, to the load that is to be driven, is in fact simplified, because the reducer is already present in the invention, and this latter may enact a reduction of the engine shaft speed by 2.5 to 3:1 and up to 1:2 (in this case it is a multiplier) relative to the crankshafts. As the power passes, by being divided, by four (4) gearing points/lines (for a preferential invention with N=4 crankshafts), each tooth transmits around four times less force, and their size is therefore reduced. The reducer present in the engine according to the invention has a couple and reduction that is identical and therefore lighter than a standard wheel-pinion reducer.

By adapting the reducer transmission ratio, the engine according to the invention makes it possible to better avoid the use of an additional reducer stage. It makes it possible to better adapt speed to the load.

Drive for an Aircraft Propeller

Aeronautical motorization of small and mid-sized propeller airplanes is generally achieved using one or more engine units coupled to a propeller, either directly at the output of the motor crankshaft, or through a reducer connected to the crankshaft or the turbine shaft of a turboprop. Adding a reducer represents additional mass, but this reducer makes it possible to set optimum propeller and engine speeds, which maximizes the specific power of the motor. Very rarely, a drive with two contra-rotating coaxial propellers is implemented using the same engine as in, for example, the combat airplane in the Second World War: Spitfire, Mark 19 and 22 or strategic bombardier of the Cold War: Tupolev 95 "Bear", because this technical choice is more complex, less reliable and heavier.

The output of the motor according to the invention may be achieved relatively easily using a contra-rotating double coaxial shaft, with very little additional mass and footprint, which ideally applies in the propulsion of a double-helix contra-rotating airplane whose speed is generally 1500 to 2500 rpm, to be connected to 2000 to 5000 rpm of the standard piston engine corresponding to a current range of 80 to 500 HP.

All other things being equal with a reducer incorporating torsion spring, to attenuate engine couple peaks.

Balancing

The engine according to the invention has a kinematic that is statically balanced, in a manner that is direct and natural, and starting with the "single-cylinder".

Dynamically, balancing is assured for all the axes except only for "swinging" (i.e. a variation in moment depending on the axis of the motor shaft). However this can be easily attenuated or even cancelled by unbalancing masses that rotate at harmonic speeds.

Terms Used by Comparison to the Standard Slider Crank-Crank Arm.

The invention describes a heat engine, with a complex chamber shape. By comparison with the standard motor, for the invention incorrectly called a cylinder, this elementary portion of the engine, comprising an elementary working volume or chamber, which is not cylindrical.

Also, by abuse of language, a motor according to the invention is called a single-cylinder, bicylinder, three-cylinder, etc. motor when when comprising, respectively, one, two, three, etc. elementary portions of motors.

Likewise, the positions within the cycle of the motor according to the invention corresponding to the minimum and maximum volumes are, by analogy, respectively named the Top Dead Center and the Bottom Dead Center, even if, in their swaying movement, the pistons of the motor according to the invention do not have a dead point.

BRIEF DESCRIPTION OF FIGURES

The figures show an engine according to the invention, here with four (4) piston assemblies per cylinder (where N=4), except for FIGS. 4a, 4b and 4c where there are five (5) piston assemblies per cylinder (where N=5), without limiting the invention, but which simplify the understanding of it when viewing the figures.

FIG. 4a is the view with hidden dashed lines in FIG. 4b, as seen from the axis of the motor.

FIG. 4b is a diagram of the 5 simplified interlocked faces of the motor, forming the chamber of a cylinder with 5 piston assemblies.

FIG. 4c is a view from FIG. 4b, where 2 adjacent faces have been removed.

FIG. 4d differs from FIG. 4b in that it presents a total of 4 faces instead of 5, from another point of view.

FIGS. 5a, 5b and 5c, show the volume of the chamber of a cylinder with 4 piston assemblies of the motor, at different crankshaft angles.

FIGS. 8a and 8b schematically describe different possible profiles of the face of a piston assembly.

FIG. 9 details the face of a piston assembly, seen from the front, a view that is orthogonal to the views in FIGS. 8a and 8b.

FIGS. 10a, 10b, 10c, 10d, 10e, 10f, 11a, 11b and 11c show various views, section views, details and exploded views of a piston assembly of the motor according to one specific embodiment, one with a segmented piston with a line segment.

FIGS. 12a, 12b, 12c, 13a and 13b, show various views, section views, exploded views and details of a piston assembly of the motor according to another specific embodiment, a piston equipped with a firebreak surface, with the anti-acceleration device.

FIGS. 15a, 15b, 15c and 15d illustrate schematically the distribution mechanism, here for exhaust, at various crankshaft angles during one cycle.

FIGS. 18a and 18b are the midline cutaway view, perpendicular to the axis Z of the same type of motor constructed in particular with piston assemblies having a firebreak surface, at two specific instants in the cycle: at Top Dead Center and with the crankshaft rotated 60°.

FIGS. 18c and 18d are the midline cutaway view, perpendicular to the axis Z of a same motor constructed in particular with piston assemblies with segmented pistons with an edge segment, at two specific two instants in the cycle: with the crankshaft rotated 130° and at 180° from Bottom Dead Center.

FIGS. 19a, 19b and 19c show, from different viewing angles, the partial assembly of one cylinder of the motor, consisting of two adjacent piston assemblies on four, with the two corresponding crankshafts.

THE FIGURES THAT DESCRIBE THE INVENTION AND ITS FUNCTION

Kinematic Diagrams

Figure 1:
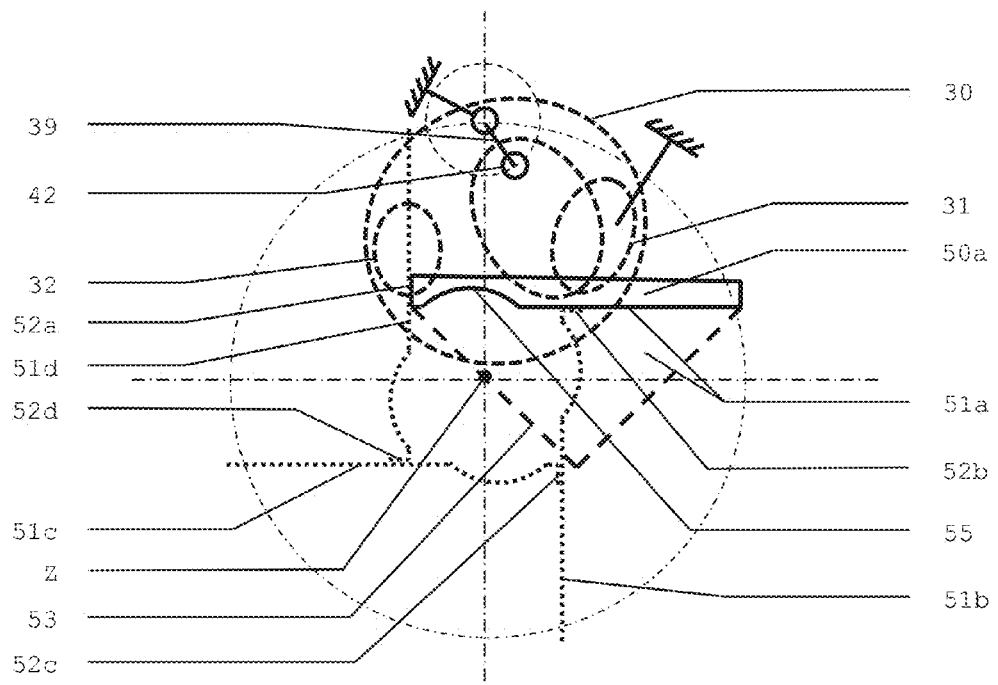
FIG. 1 is a generic kinetic diagram of the invention in general, which shows, for one cylinder of the motor, a piston assembly, driven by a drive shaft or by a crankshaft and its contacts relative to the faces of the other piston assemblies, as seen along axis Z of the motor, in a midline cutaway view.

FIG. 1 is a general kinematic diagram of the invention in general, showing, for one cylinder of the motor, a $1^{st}$ piston assembly with its cylinder face (51a) and its sliding surface (52a), driven by a drive shaft (39) or a $1^{st}$ crankshaft (40a), through and part of a cyclic drive and orientation mechanism (30) of the $1^{st}$ piston assembly, which here is a generic one, as well as the contacts which constrain this $1^{st}$ piston assembly relative to the cylinder faces (51b, 51c, 51d) and sliding surface (52b, 52c, 52d) of the other adjacent piston assemblies, which are partially shown.

The sliding surface (52a) of the $1^{st}$ piston assembly slides against the cylinder face (51d) of the $4^{th}$ piston assembly.

The sliding surface (52b) of the $2^{nd}$ piston assembly slides against the cylinder face (51a) of the $1^{st}$ piston assembly.

The $1^{st}$ drive shaft (39) or the crankshaft (40a), in this generic version, makes monotone cyclical rotations of one or two turns per cycle, depending on the complexity and design of the cyclical drive and orientation mechanism (30). For alternative or "semi-alternative" rotations alternatives, the invention would therefore be limited to a single-cylinder.

During the course of one cycle, the working volume reaches at least one minimum (at TDC) and at least one maximum (at BDC). This leaves the possibility, which to be sure is technically not very feasible because it makes the distribution device and the cyclical drive and orientation mechanism (30) more complex, of a 4-stroke engine with scan volumes that are different during the processes of compression and expansion, which results in a true Miller cycle.

The cyclical drive and orientation mechanism (30) shown schematically here does not limit the invention and may be of several types:

Rack and pinion, a complex solution with an intermediate pinion with semi-rotational rotation, for pushing the piston assembly in alternative translation, and with the pinion driven via a slider crank by the drive shaft in continuous, monotone rotation.

crank arm and slider crank for pushing the slider-mounted piston assembly, with an alternative translation motion.

The cyclical drive and orientation mechanism (30) of the $1^{st}$ piston assembly, with the sliding contacts of the sliding surfaces of a piston assembly on the cylinder face of an adjacent and surrounding piston assembly, requires, at all times in the cycle, kinematically, that the front edge (53) of the N piston assemblies cuts through axis Z of the motor, which is likewise required by the repetition of revolution of the components of the motor about its axis Z.

Figure 2A:
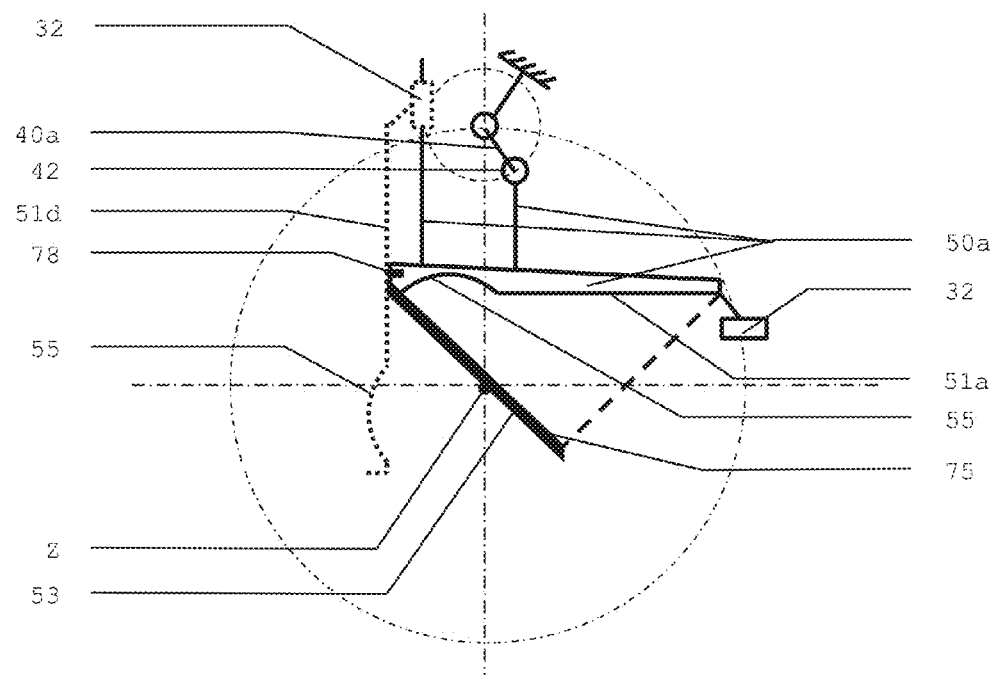
FIG. 2a is a specific kinematic embodiment of FIG. 1 where the piston assemblies are guided relative to each other by a slider.

FIG. 2a is a specific kinematic embodiment of the invention, illustrated starting with FIG. 1 where the piston assemblies are guided between each other by a slider (32). This is an embodiment that is kinematically possible, but technically voluminous and complex, and therefore not preferable and not developed further.

Figure 2B:
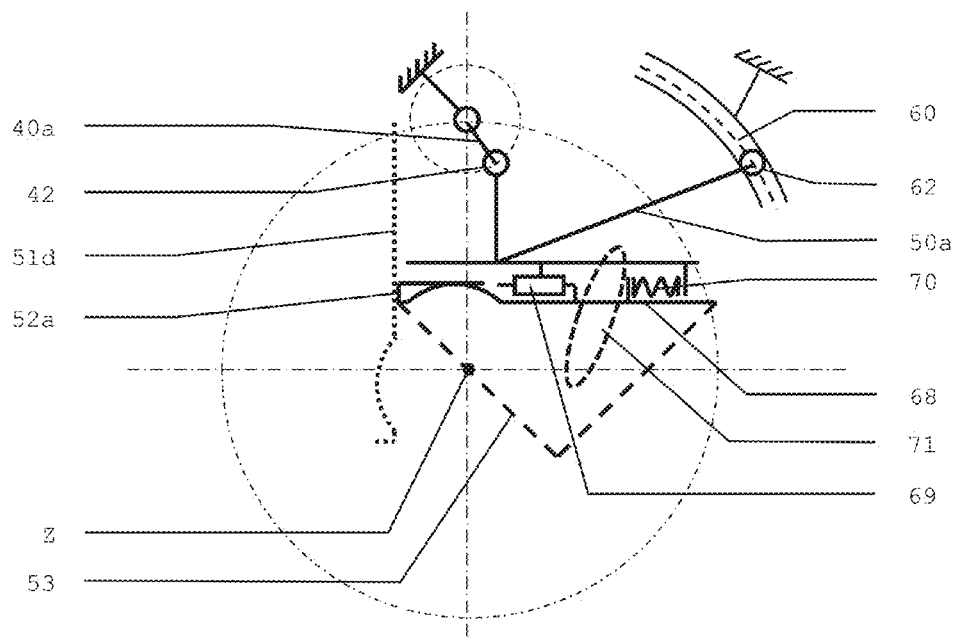
FIG. 2b is a specific kinematic embodiment of FIG. 1 where the piston assembly consists of a piston and a firebreak surface, slider-mounted and where this piston is guided in rotation by a slider-pivot.

FIG. 2b is a specific kinematic embodiment of FIG. 1 where the piston assembly comprises a piston and a firebreak surface. The piston (50a) is driven directly by the crankshaft (40a) via the crank pin pivot (42) and guided in rotation by a pivot slider (62, 60). The firebreak surface (68) that comprises the cylinder face and the sliding surface (52a) may be translated via a slider connection (69) relative to the piston and is thrust in this translation by a spring system (70) to maintain some pressure of the sliding surface (52a) against the cylinder face (51d) of the adjacent and surrounding piston. Also, an anti-acceleration device (71), not detailed here, assists the spring system (70), so that the pressing force does not vary in relation to the inertial forces to which the firebreak surface (68) is subjected.

Figure 3:
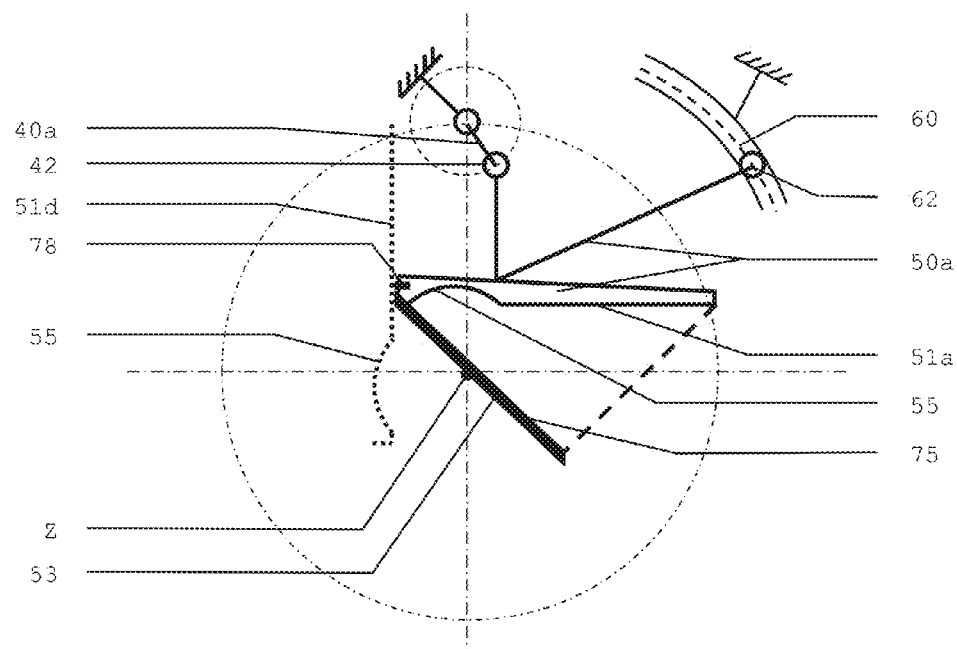
FIG. 3 is a specific kinematic embodiment of the invention, based on FIG. 1 where the piston assembly is simply a piston that is guided in rotation by a slider-pivot and features a sealing device.

FIG. 3 is a specific and preferential kinematic embodiment of the invention, because it is the simplest, since the invention emanates from FIG. 1 where the piston assembly is simply a piston (50a) that is driven directly by the crankshaft (40a) via the crank pin pivot (42) and guided in rotation by a pivot slider (62, 60) and equipped with a sealing device (78) in the area of the front edge (53).

In all manners of embodiment of the invention, the direction of rotation of the crankshafts is indeterminate. The selection of the direction of rotation depends primarily on a compromise between; firstly, dynamic optimization, i.e. inertial and pressure forces in the connections, in particular the pivot slider; and, secondly, on the effectiveness of the distribution diagram obtained, through the possible shape of the apertures.

Interlocking of the Cylinder Faces of the Piston Assemblies and Shape and Volume of a Cylinder Chamber FIGS. 4a, 4b, 4c and 4d, illustrate schematically the interlocking of the N cylinder faces (51a, 51b, 51c) of the N piston assemblies of a cylinder of the motors, with these N faces encasing a variable volume during one cycle, which is called the chamber (35) of a cylinder. In practice, N may, with difficulty, be equal to 5 or more, may be equal to 3 but with a lesser potential, and perhaps equal preferably to 4, and it is this number that will be selected for all the figures except for 4a, 4b and 4c which illustrate the layout of the 5 faces of a cylinder of an embodiment of the motor, with 5 piston assemblies.

FIG. 4c, by not showing 2 adjacent cylinder faces out of the 5, reveals the chamber of cylinder (35), whose cylinder faces (51a, 51b, 51c) do not have a spherical cap.

We can distinguish the contacts between face where the sliding surface (52b) slides against cylinder face (51a)

FIGS. 5a, 5b and 5c, show the volume of the chamber of one cylinder of a motor according to the invention, which has a drive and orientation mechanism of the type shown in FIGS. 2a, 2b and 3, at different crankshaft angles during the cycle, respectively at:

0° at minimum volume, also named Top Dead Center, by analogy to the traditional piston slider crank motor. The surface of this chamber volume therefore corresponds to the combustion surface sections of the cylinder faces closest to the sealing device.

90° in mid-stroke, at intermediate volume and shape,

180° at maximum volume, named Bottom Dead Center by analogy.

FIGS. 5a, 5b and 5c likewise show the 2 chamber caps (36s, 36i), as well as the spherical caps (55) of the cylinder faces of the piston assemblies.

Drive of Crankshafts and Motor Shaft

Figure 6A:
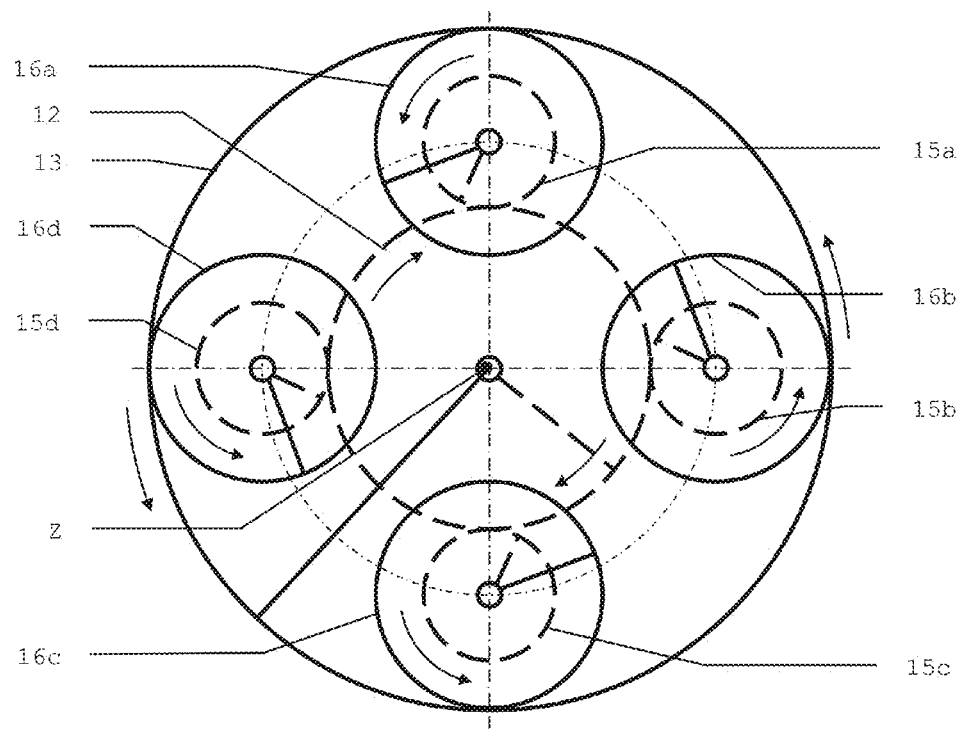
FIGS. 6a and 6b are two orthogonal views of the same kinematic sketch of the motor's synchronization device, consisting of a contra-rotating shaft.
Figure 6B:
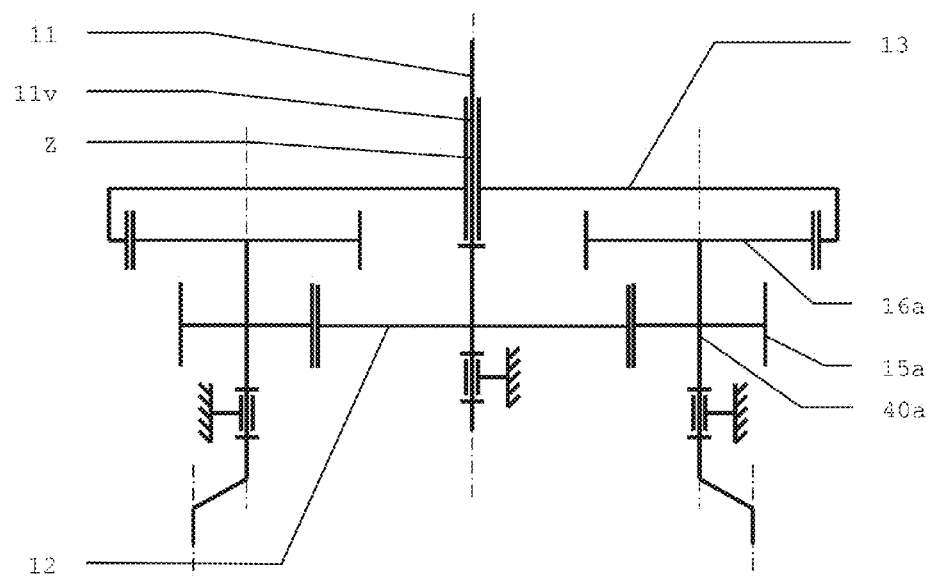

FIGS. 6a and 6b represent the kinematic diagram of the motor's synchronization device, where the motor is made of a gearing of 4 satellite pinions (15a, 15b, 15c and 15d) of the 4 crankshafts on a central gear (12) that is integral to the output shaft (11) of the motor, and which is coaxial with the axis z of the motor.

In the operation of a preferred embodiment of the motor according to the invention, which is imposed by this device meshing here, the crankshafts make continuous rotations of one rotation per cycle.

Also, one very specific embodiment of this synchronization device is obtained by adding a second shaft that is contra-rotational to the first (11v), coaxial and surrounding this latter, which is integral to a crown gear (13) that meshes internally with N other additional satellites (16a, 16b, 16c and 16d) which are coaxial to the first ones. Technically, these double satellites could be mistaken to be identical by showing two diametrically opposed gearings, one internal with the crown gear (13), the other external with the wheel (12), but then the speeds of the motor output shaft (11) and the contra-rotational shaft (11v) would be very different.

This arrangement with the contra-rotational shaft applies most especially to the propulsion of an aircraft, where each shaft drives a shaft, and each turns in the opposite direction of the other.

The figure is not restrictive of the invention, in fact, the output shafts (11 and 11v) may, in their connection with the wheel (12) and the crown gear (13), be equipped with a moment damper or torsion springs, in order to attenuate the fluctuations of the motor couple. Also, wheel (12) and crown gear (13) could be inverted with the permutation of the position of satellites (15 and 16) on the same shaft.

Slider-Pivot Connection and Specific Slider Shape

Figure 7A:
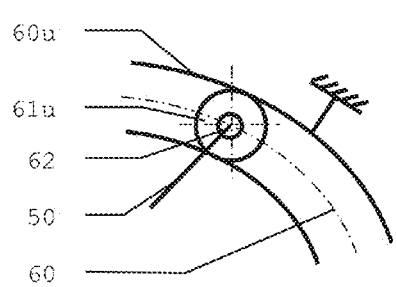
FIGS. 7a, 7b and 7c have multiple variations of the pivot slider connection, which orients the piston assembly.
Figure 7B:
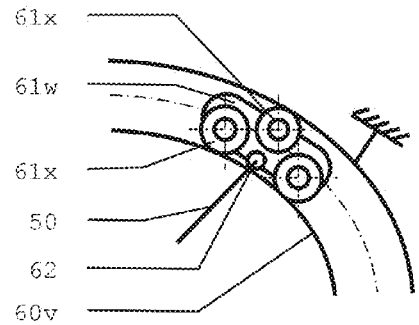
Figure 7C:
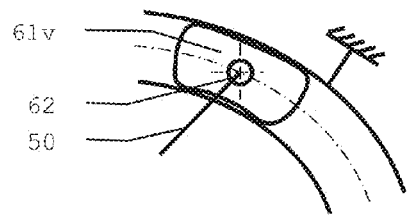

FIGS. 7a, 7b and 7c present several variants of the connection known as the pivot slider (62), which orients the piston assembly or the piston (50) using a mobile component (61) in a fixed slider (60u) and which pivots on it.

FIG. 7a shows the simplest embodiment where a roller (61u) rolls in the slider (60u).

FIG. 7b shows an embodiment with a rolling shoe (61w), which is equipped with rollers (61x). The advantage of this solution is that the rolling contact points do not change the slider flank (60v), relative to the roller (61u) alone.

FIG. 7c shows an embodiment with a sliding shoe (61v), that is simpler and more compact, but which has more friction than the previous two.

These 3 illustrations, FIGS. 7a, 7b and 7c are not limiting, because the invention may also retain sliding or rolling components as well as double-mounted sliders, doubled identically according to a translation about an axis Z of the motor, which is the axis of projection of the three views. Likewise, even if it is more voluminous, the inversion is technically possible: The groove is a curved, fixed rail that supports, on both sides of these 2 faces, the rolling contact of the rollers of the rolling shoe.

Also, a hybrid shoe is possible, one that slides against a first slider flank (60v) and which rolls against the second slider flank by means of a roller (61x).

Figure 7D:
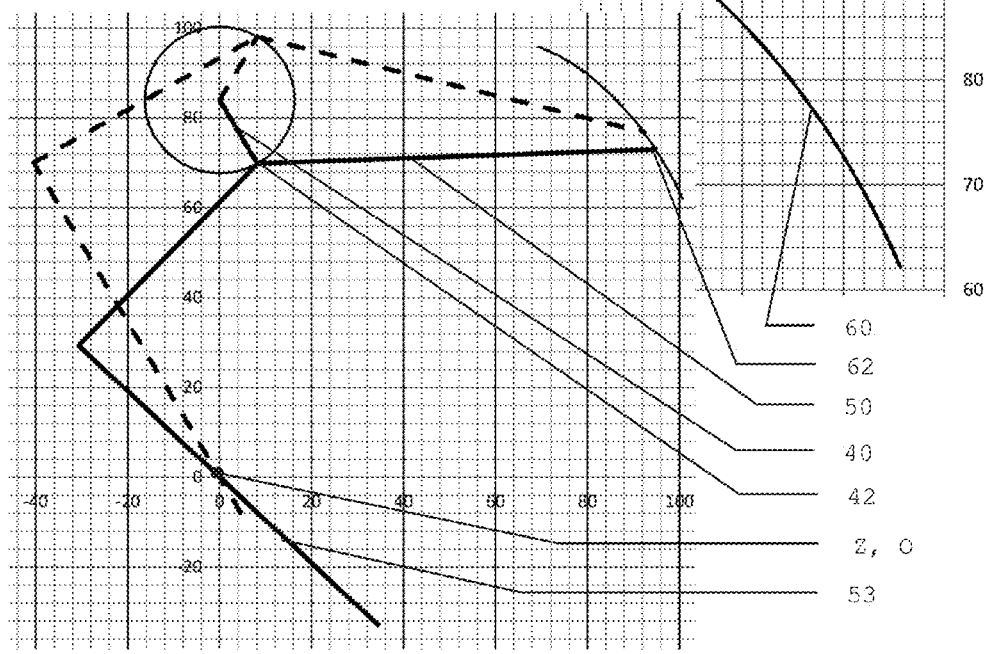
FIG. 7d shows one large and one small graphic that illustrate the precise trajectories of the characteristic points of a piston.

FIG. 7d shows one large and one smaller graphic, a partial enlargement of the first, illustrating the precise trajectories of the characteristic points of a piston, according to a preferred embodiment of the invention consisting of a piston assembly comprised of a segmented piston and a crankshaft drive mechanism (40) in continuous rotation and pivot slider piston orientation mechanism.

The thick, continuous black segments illustrate, for one crankshaft angle of the cycle, the position of the two pivots and of the front edge (53) of piston (50).

The thick black broken segments illustrate the same thing at a different crankshaft angle.

The slider trajectory (60) obtained by calculation is an example of illustrated resolution, for a motor whose axis Z, which is the normal axis in this view, is at the origin of the graphic, graduated in millimeters (mm) and whose axis of the 4 crankshafts (40) is at a*84 mm from this latter. The crank pins of the crankshafts are eccentric by a*16.3 mm; the orthogonal distance between the piston's pivot and its front edge is a*56.1 mm; the distance between the pivot (42) of the piston and the pivot slider (62) is a*86.7 mm.

The slider trajectory (60) is a curve that is as regular as possible, passing noticeably close to the 5 coordinate points:
1. (X=a*69.4; Y=a*95.8)
2. (X=a*77.2; Y=a*91.8)
3. (X=a*85.0; Y=a*85.3)
4. (X=a*92.8; Y=a*76.0)
5. (X=a*100.7; Y=a*62.2)

When the scale factor a=1, these dimensions and coordinates correspond to a motor of volumetric cylinder volume of around 500 cm$^3$, giving a profile angle of the piston face (54) in the shape of a 90° "V", and which can be adapted for other sizes of engine according to the invention via this scale factor. Also, each dimension and coordinate may vary very slightly.

The reverse return of this calculation, in reality, the motor according to the invention, by imposing dimensions and positions of parts and that most especially of this specific slider trajectory (60) and due to the fact that the front edge (53) of the piston cuts through axis Z of the motor at the two chamber tops, these conditions kinematically assure that, at all times in the cycle, the variation amplitude of the working stroke in translation of the segmentation, i.e. its relative translational movement between the piston and the front edge is less than 0.3 mm (for a=1).

In reality, it is the frontal edge which, being located on the edge segment, will be pressed by the piston to fill up this small positional gap, which varies during over the course of a cycle.

Constitution of Piston Assemblies: Preferred to Segmented Piston or Otherwise not Preferred to a Firebreak Surface FIGS. 8a and 8b schematically describe different possible profiles for piston face (54) of cylinder face (51) of a piston assembly, seen in relation to a sliding axis W, in which the axis is the direction of rectilinear translation generated by scanning one of these profiles, the sliding surface (48u) of the cylinder face. The profile is generally concave, partially closed over point O, whose position changes during a cycle, with axis Z of the motor, since the piston goes back and forth.

The position of axis Z of the motor, at its extreme noted as (Z−) corresponds to the Top Dead Center, whereas the extreme noted as (Z+) corresponds to the Bottom Dead Center. Also, FIGS. 8a and 8b show the spherical cap (55) and the rounded part of profile (54u) without showing the bulge (55u) of the cylinder face in its preferred manner of embodiment, as in FIG. 11a.

The invention does not impose symmetry on these profiles. The front edge (53) is not necessarily straight on the zones where the chamber cap (53s, 53i) passes, as indicated in FIG. 9.

FIG. 8a shows a "V"-shaped profile with a rounded point.

FIG. 9, according to one particular manner of embodiment of the invention, schematically details the cylinder face of a piston assembly, seen from the front, with: the front edge (53), the cap known as a spherical cap (55), the orifice (58w) through which the injector, or the ignition spark plug and the intake (56s) and exhaust (56i) apertures emit; these apertures may be multiple openings with a grating, but are aligned relative to the front edge (59v) of the adjacent surrounded piston assembly, which slides on this cylinder face and which uncovers the apertures during a cycle, connecting the transfer units (57) with the chamber (35), as illustrated when the apertures (59v) open or close, at the Top Dead Center (59w) and at the Bottom Dead Center (59u). The use of apertures (56s and 56i) for distribution, associated with a drive and orientation mechanism consisting of a crankshaft in continuous and monotone rotation, as illustrated in FIGS. 2a, 2b and 3, requires, in this particular and preferred manner of the invention, the use of a two-stroke cycle heat engine. The sealing device is not shown.

The cylinder face is subdivided into two portions:
  the sliding surface (48u) which supports the sliding of the sliding surface of the surrounded adjacent piston assembly,
  the combustion section (48v), on which there is no sliding and which confines the chamber (35) at the instant of its combustion near the Top Dead Center.

The separation between these two portions is the position of the front edge of the face that is adjacent to the Top Dead Center (59w).

FIGS. 10a, 10b, 10c, 10d, 10e, 10f, 11a, 11b and 11c show various views, section views and exploded views of a piston assembly, consisting of a piston (50) with its segmentation, according to a specific and preferred embodiment of the piston assembly of the invention known as a segmented piston assembly, with edge segment (75).

The piston assembly is equipped with double rollers (61u), which means there are also double sliders. FIGS. 10a and 10e are corresponding views, from the front and top along axis Z of the motor. FIGS. 10b, 10c and 10d detail the composite segmentation of edge segment (75), of the secondary segment (78), the labyrinth seal (76) and its grooves (77) which fit into the corresponding grooves in the piston. The two segments (75, 78) are free to translate slightly inside the piston along the non-limiting sliding axis W visible in FIG. 11b, but are kept in this one-sided motion by the pressure of a spring device (not shown), located in the bottom of the piston grooves, ideally wavy leaf springs, and on the other side, by contact against the face of the adjacent and surrounding piston (not shown). The labyrinth seals (76) shift in the direction of their groove, which is at best simply perpendicular to the direction of the nearest front edge segment (53), and they are pressed in the hollow of the edge segment (75), which here is straight in shape, by a spring device (not shown). These relative motion constraints require a straight labyrinth seal (76). The secondary segment (78), which performs a sealing or scraping function, forms, with the edge segment (75) the sliding surface (52), which is not quite fully continuous, in order to limit gas leaks when this sliding surface (52) passes over the apertures (56s and 56i) of the sliding surface of the cylinder facing the adjacent surrounding piston (not shown).

All these positionings, contacts and pressurizings make it possible to close the chamber topologically.

In FIG. 10a, we observe both the transfer units (57s and 57i) and the intake (56s) and exhaust (56i) apertures. This illustration does not limit the invention and the exhaust transfer unit (57i) may consist of one or more cooling fins; it may be an applied component, affixed to the piston, or even extending from the same piece of material.

FIG. 10e shows the pivot of the crankshaft crank pin (42) and the roller pivot slider (62). Here the piston is reinforced by the 4 buttresses and shown cut away for clarity.

FIG. 10f shows the edge segment (75) and illustrates, besides its thickness, the fact that it is flat. It comprises the front edge (53) and its segments (53s, 53i) where the upper and lower caps of the chamber shift. On these segments, the front edge (53), in its concrete embodiment, consists of a small chamfer or fillet or other machining to remove the sharp cutting edges, small in size, around 0.2 mm or less for the chamfer, to enable isostatic operation, i.e. an interlocking of the cylinder faces (51) and surfaces (52) that slide relative to each other to form the two caps, despite a dimensional dispersion of the parts. In concrete terms, where each upper (36s) and lower (36i) cap comprises a very small passage with a cross-section less than 0.1 mm$^2$, causing a "blow-by" or gas leak, whose flow rate is low enough that it does not affect the compression of the motor.

FIGS. 11a and 11b show the bulge (55u) of the cylinder face (51), which protects the segments (75, 78) from hot gases by keeping them away from the chamber, which just misses the cylinder face of the adjacent surrounding piston (not shown), whereas it is the sliding surface (52) that slides against this latter.

In the exploded view in FIG. 11c we can see the intake and exhaust transfer units (57s) and their connection with the apertures (56s) of the cylinder face (51) of the piston and their second opening in the transfer plate (64).

In order to ensure proper sealing with the rotary plate (22), while it is operating, this transfer plate (64), may be connected to transfer unit (57), through the use of an elastic bellows, allowing for a few tenths of millimeters of compression and thus absorb the geometric dispersions between the N transfer units (57) of the N pistons (50), or thermal expansions, relative to the same rotary plate (22).

The insert in detail E of FIG. 11c shows the segmentation: the edge segment (75), the sealing segment (78) and the labyrinth seal (76) and its grooves (77), which correspond to those in piston (50).

FIGS. 12a, 12b, 12c, 13a and 13b, show various views, cutaways, exploded views and details of a piston assembly of the motor according to a specific embodiment, which is not a preferred embodiment because it is complex, and which is comprised of a piston (50) equipped with a firebreak surface (68), with the anti-acceleration device and equipped here with a single roller (61u). The piston assembly is called a firebreak surface piston assembly.

FIG. 12a is the section view of FIG. 12b, as seen along axis Z of the motor and passing through the center O of the cylinder, section view A-A indicated on the face view, FIG. 12c. We can see the injector or spark plug (58), emitting into the chamber, crossing the firebreak surface (68) that can slide on piston (50) and kept pressurized by spring (70), against the firebreak surface of the adjacent and surrounding piston assembly (not shown).

FIG. 12c shows the upper shutoff valve (65), a device according to a specific non-preferential embodiment of the invention, arranged on the cylinder face (51) and making it possible to close the aperture (56s) by masking it, in order to obstruct the transfer unit, at certain times in the cycle.

Figure 13A:
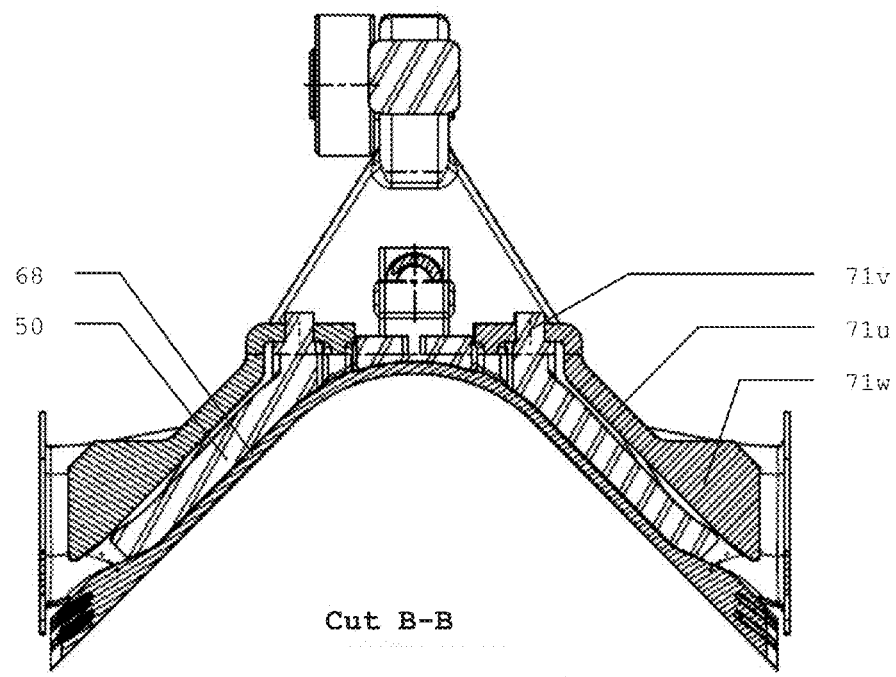
Figure 13B:
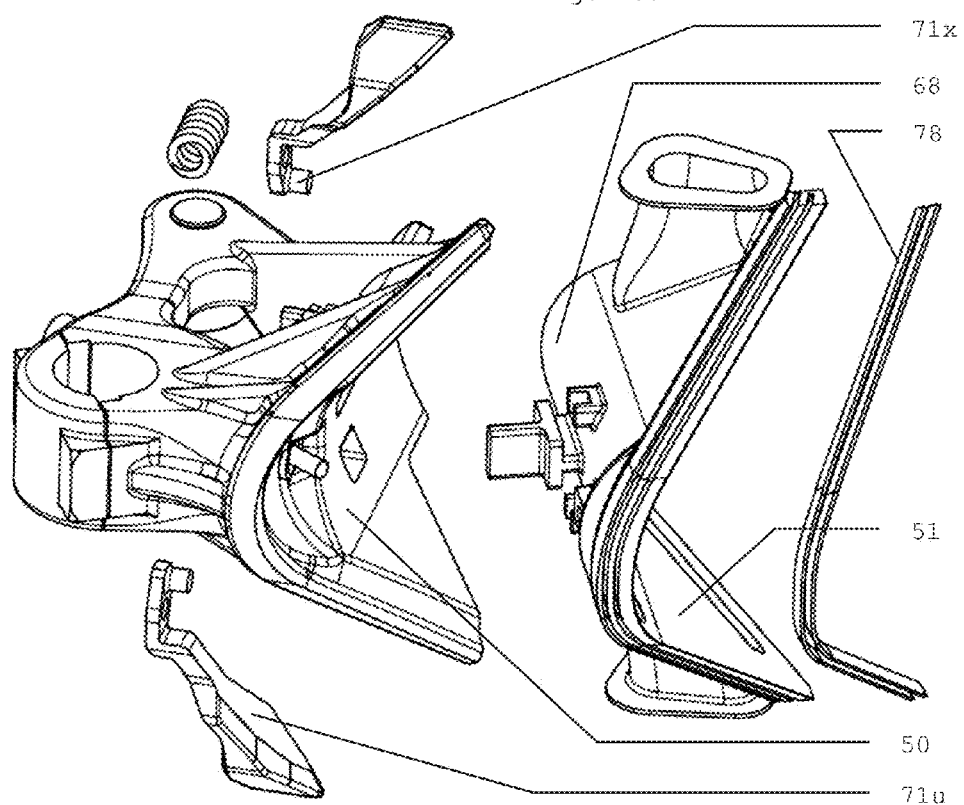

The section view B-B, which illustrates FIG. 13a, the anti-acceleration system, doubly consisting of a lever (71u), which pivots on [about?] piston (50) to pivot (71v), equipped with a counterweight (71w) and which drives the firebreak surface (68) in its translation relative to piston (50) through a drive connection (71x), which is visible in the exploded view of FIG. 13b, which likewise shows piston (50), the two levers (71*u*), and the firebreak surface (68), which consists of the transfer units and two secondary segments (78).

Direct Injection by Injection Pump

Figures 14A, 14B, 14C:
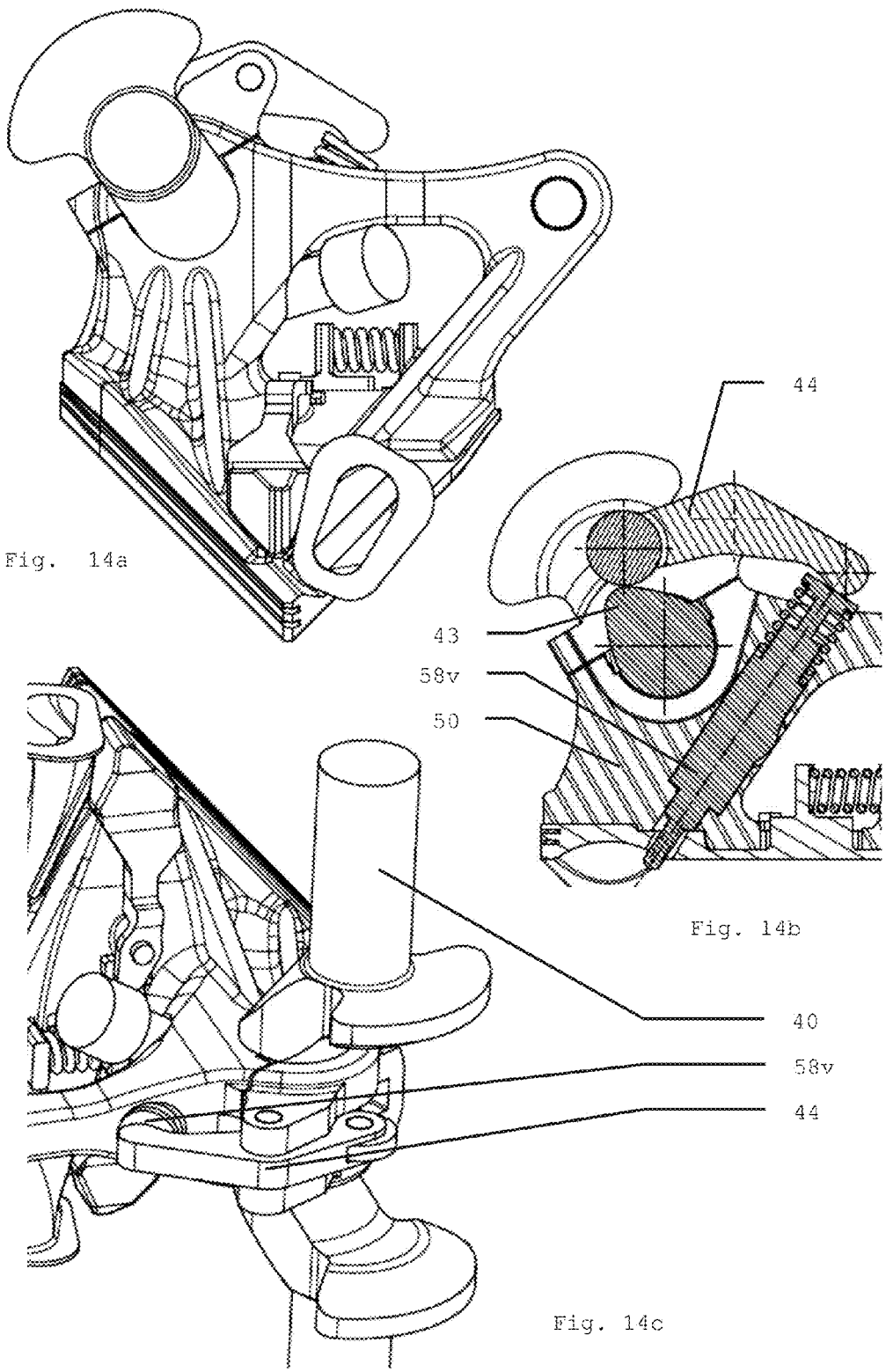
FIGS. 14a, 14b and 14c, illustrate the specific injection pump embodiment.

FIGS. 14*a*, 14*b* and 14*c* illustrate a specific embodiment of the piston assembly of the invention, known as a injection pump (58*v*) in which the latter is activated here by a roller lever (44), which operates a cam (43) that is part of the crankshaft crank pin (40). By analogy, the crankshaft crank pin (40) behaves like a cam shaft for a cylinder head, which is the piston.

FIG. 14*b* is the midline cutaway view that passes through the center O of the cylinder, in partial view in FIG. 14*a*, seen along axis Z of the motor of a piston assembly equipped with an injector-pump (58*v*), whereas FIG. 14*c* is an isometric view of it showing the crankshaft (40) and the lever (44).

These three FIGS. 14*a*, 14*b* and 14*c* do not limit the arrangement of this injection pump (58*v*) to only a piston assembly with firebreak surface as shown, but the injector-pump may also be arranged on a piston assembly with a segmented or other type of piston. This injector-pump solution is intended for direct injection of diesel-type fuel, for ignition by compression, but without limiting the invention, which could use a standard direct injection, especially for controlled ignition engines, using gasoline. In this case, the injector uses its flexible pressurized gasoline inlet and its electrical control, which is likewise flexible. Also in this case, the orifice through which the injector emits may be placed on the sliding surface of the cylinder face, so that, when compression starts, injection can occur and make a wide spray that is aimed at the center of the chamber at this instant in the cycle. The invention may also, according to a manner of embodiment that is not a preferred one, choose an indirect injection that is located, for example, in the intake manifold, for a controlled ignition engine.

FIGS. 15*a*, 15*b*, 15*c* and 15*d* schematically illustrate a specific and preferential embodiment of the distribution mechanism of the invention, here the exhaust, at different crankshaft angles (40) during one cycle. The intake operates on the same architecture, with arrows that are of course in opposite directions, as well as angular wedgings and drawings of different apertures.

Rotary plate (22*i*) is driven by a toothed gear (18), through the gearing of the drive pinion of rotary plate (17), which is integral to crankshaft (40). The speed of the rotary plate (22*i*) is an average of a quarter-turn per cycle or per crankshaft turn (40), because this distribution mechanism applies to a two-stroke cycle engine. The speed of the rotary plate is one-quarter on average, because the invention could not be limited to gear (18) and pinion (17) with pitch circles; it uses non-circular toothed pitch circles, in order to better optimize the diagram, which here is the exhaust diagram.

The rotary plate (22*i*) therefore, turns its four apertures (23*i*), which pass, on one face, pass in front of the four fixed apertures (21*i*) of the exhaust manifold (20*i*), and which could, on the other face, cross the four apertures of the exhaust transfer units (57*i*), which have a swaying movement, that is specific to the piston that supports them. This way, all these apertures, depending on their specifically determined shape, an optimal shape that is not the one illustrated by these four FIGS. 15*a*, 15*b*, 15*c* and 15*d*, but which gets close enough to it to illustrate its operation, open or close the exhaust at specific instants of the cycle of the engine, in compliance with the distribution diagram in FIG. 17.

FIG. 15*a*, at a crankshaft angle of 180°, where its crank pin is the furthest from axis Z of the motor, i.e. at Bottom Dead Center, illustrates the exhaust with maximum or quasi-maximum recovery apertures.

FIG. 15*b*, at a crankshaft angle of 0°, where its crank pin is the closest to axis Z of the motor, i.e. at the Top Dead Center, illustrates complete closure of the exhaust with apertures that do not get covered.

FIG. 15*c*, at a crankshaft angle of 120°, i.e. at a moment that is close to when the exhaust opens, shows a complete closure because the apertures (23*i*) in the rotary plate do not connect with the apertures of the exhaust transfer units (57*i*).

FIG. 15*d*, at a crankshaft angle of 220°, i.e. at almost the same instant the exhaust closes, shows a partial opening, because the apertures (23*i*) of the rotary plate are halfway facing the exhaust transfer apertures (57*i*) and partially facing the apertures (21*i*) of the fixed intake manifold (20*i*).

These four FIGS. 15*a*, 15*b*, 15*c* and 15*d*, do not limit the distribution mechanism of the invention. Effectively, the drive of the rotary plate (22*i*) may be produced using an intermediate pinion and equipped with an angular phase changing system.

Figure 16:
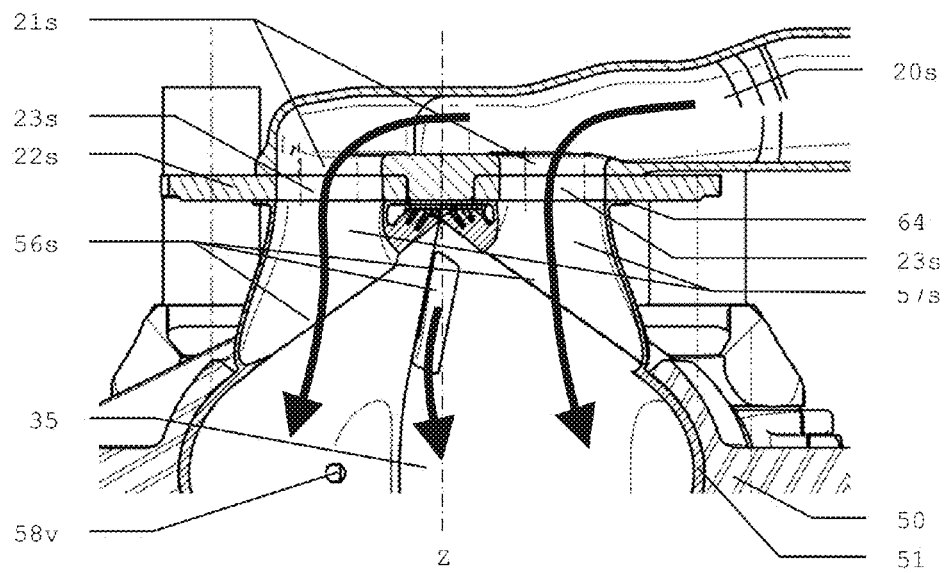
FIG. 16 is a section view, at the moment of intake, showing the filling of a cylinder that is partially visible.

FIG. 16, even if it illustrates the intake, completes the four preceding figures because it shows, with a section view of the cylinder relative to a plane passing through axis Z of the motor, the arrangement of the apertures and conduits relative to each other. The flat rotary plate (22*s*) is in permanent contact, on both of its faces between the plane of the intake manifold (20*s*) consisting of its apertures (21*s*) and the plates (64) of the transfer units (57*s*). We can see how the air admitted into the intake manifold (20*s*), and then into transfer units (57*s*) expels into the cylinder through the intake apertures (56*s*), of which two are shown in section view among the three shown out of the four from this cylinder.

This FIG. 16 does not restrict the invention, because it does not illustrate the use of an additional plate (24) that is mounted between the intake manifold (20*s*) and the rotary plate (22*s*), which is doubly pressed by its flat, parallel faces, against the flat face of these latter two. Also, this additional plate (24), which has N distributed apertures whose shape must fit into the apertures in the rotary plate and intake manifold, in order to modify the distribution diagram by using rotation to adjust, about axis Z of the motor, the angular position of this additional plate (24), which is simpler than changing the phase of the rotary plate (22).

These four FIGS. 15*a*, 15*b*, 15*c* and 15*d* and FIG. 16, illustrate the distribution system in a preferred manner of embodiment of the motor according to the invention. In fact, the distribution device, without the rotary plate (22), would of course function, with opening surfaces that are smaller and a distribution diagram that is more limited. However the need for the rotary plate also lies in the fact that it closes the intake manifolds (20) outside of the intake and exhaust phases that would eliminate pressure losses and improper mixing of gases.

Figure 17:
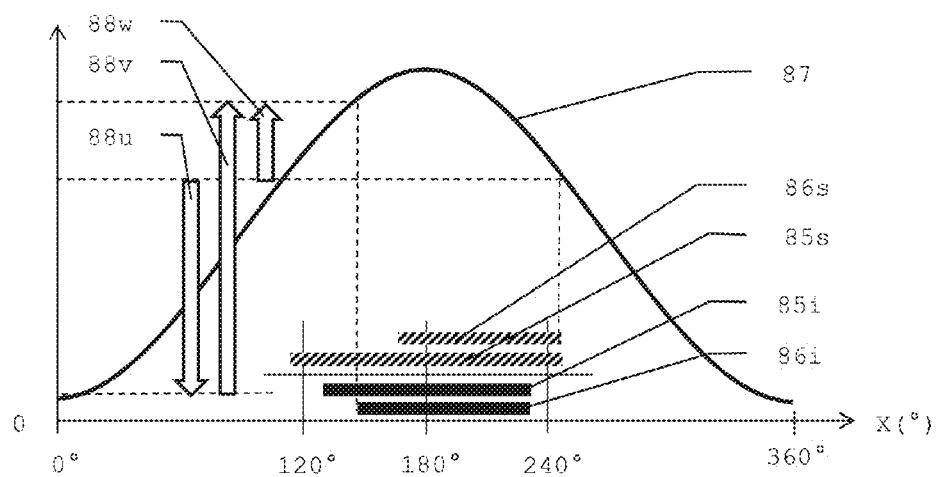
FIG. 17 shows the distribution diagram and the volume curve of a cylinder, of an example of motor according to the invention.

FIG. 17 shows the distribution diagram of the motor in a preferred version, of a specific embodiment of the two-stroke cycle invention. Abscissa X indicates the angle of the crankshafts in degrees.

Bar (85*s*) shows the angular range of the intake opening between chamber (35) and transfer (57*s*).

Bar (86*s*) shows the angular range of the intake opening between transfer (57*s*) and intake manifold (20*s*).

Bar (85*i*) shows the angular range of exhaust opening between chamber (35) and transfer (57*i*).

Bar (86*i*) shows the angular range of exhaust opening between transfer (57*i*) and intake manifold (20*i*).

For intake or exhaust to occur, 2 bars must open: the opening between chamber (35) and transfer unit (57) and the opening between transfer unit (57) and intake manifold (20).

The angular values of the opening ranges are here for realistic function, without being optimal.

Curve (87) shows the volume of a cylinder, referenced on the ordinate as a function of X.

We can note here that the ranges of opening between chamber and transfer are symmetric about the Bottom Dead Center (180°); however they are different between intake and exhaust, due to the very fact of the arrangement of the piston faces relative to each other and of their apertures and the fact of the kinetics of the motor. On the contrary, the opening diagram between transfer and intake manifold is asymmetric, thanks to the freedom of shape offered by the apertures in the two rotary plates, the intake manifolds and transfer plates (64). This asymmetry or freedom of the diagram makes it possible to efficiently implement the Miller-Atkinson cycle, which is distinguished by a stroke, or here, an effective expansion volume (88v) that is higher than the actual compression volume (88u), the difference between the two being the expansion over-volume (88w), which could reach from 0% up to +80% of the effective compression volume (88u).

This asymmetry and freedom in the distribution diagram also make it possible to leave more time to allow the pressure to decrease between the exhaust opening and the intake opening, and thus avoid exhaust gas reflux in the intake when it opens. This way, the angular time required to pressure-fill the cylinder intake after the exhaust closure and before the intake closure can be optimized.

If needed, to a certain extent, during the operation of the motor according to the invention, these angular intake and exhaust ranges may be modified, using phase changes of rotary plates (22) or using an additional plate (24) (not shown), that is angularly adjustable about axis Z of the motor, and arranged between an intake manifold (20s/20i) and the corresponding rotary plate (22s/22i).

Operation of the Engine

The four FIGS. 18a, 18b, 18c and 18d, illustrate the functioning of the engine according to two specific manners of embodiment of the invention, by a section view of a cylinder, perpendicular to axis Z of the motor, passing through its center O, at different times in the cycle. They show the piston assemblies, in one specific manner of embodiment, comprised of pistons (50) and firebreak surface (68) for FIGS. 18a and 18b, injectors and/or spark plugs (58), the crankshaft crank pins (42) and sliders (60u) and their pivot (62), as well as the chamber (35) which is variable in volume and shape. FIGS. 18c and 18d show a piston assembly, constructed according to one specific manner of embodiment of the segmented-piston type.

FIG. 18a illustrates the Top Dead Center, for a crankshaft angle of 0°, where the volume of chamber (35) is at a minimum and is confined here in a quasi-spherical volume, which in any case is very compact, and having a minimum wall surface area, due to the four spherical caps (55) that are arranged on the combustion sections (48v) of the cylinder faces (51).

FIG. 18b illustrates an intermediate instant of the cycle, for a crankshaft angle of 60°, in which chamber (35) has a volume that is greater than the minimum and a shape that is still compact.

FIG. 18c illustrates an intermediate instant of the cycle, for a crankshaft angle of 130°, with, at the bottom, near the top of the chamber, a partial opening of the four apertures of the piston cylinder faces (56i: arbitrarily, the exhaust piston).

FIG. 18d illustrates the Bottom Dead Center, for a crankshaft angle of 180°, where the volume of chamber (35) is at a maximum, with complete opening of the four apertures of bottom (56i).

Another way of understanding the operation and sealing of the motor is to see that the pistons (50) just miss each other without touching, at all times of the cycle, with a very small gap that varies very little during the course of the cycle due to the judicious shape and positioning of the slider trajectory, among other dimensions. These are the segments (75) or fire-break faces (68) that close the volume of the chamber with the cylinder faces and provide sealing, on all the front edges, from one chamber cap to the other.

These four FIGS. 18a, 18b, 18c and 18d do not limit the invention, in fact other arrangements of spark plugs and direct injectors are possible, by passing by a spark plug and an injector on the same piston, or also an injector not expelling through the spherical cap or the combustion section, but rather expelling onto the sliding surface in the case of a controlled ignition engine, in order to permit injection at the start of compression, distributing the spray in the center of the chamber, with a preference for the configurations with a distribution that is balanced about axis Z of the motor.

These four FIGS. 18a, 18b, 18c and 18d show the injectors and spark plugs, but do not show their electrical or fuel supply lines. This omission does not limit the invention. In fact, these supply lines may be wires or pipes, flexible and elastically deformable, or even articulated telescoping conduits.

Assembly View of a Single-Cylinder Motor

All of the figures in FIG. 19a through FIG. 23b show a single cylinder motor, according to a specific embodiment of the invention, which is completed by its constituent components, figure by figure and whose piston assemblies are a preferred embodiment of the segmented piston type with an edge segment.

FIGS. 19a, 19b and 19c, according to different viewing angles, along axis Z of the motor for FIG. 19a and isometric for the other two, show the partial assembly of a cylinder of the motor, consisting of two adjacent piston assemblies, out of four, with their two pistons (50) and the two corresponding crankshafts (40), oriented at 90°, i.e. at a position of the cycle in mid-stroke. We should note the interlocking of one piston into the other, with a contact occurring on the cylinder face (51), by the edge segment (75).

FIG. 19c, from its viewing angle, shows chamber (55). A crankshaft consists of a pinion (17), for driving a rotary plate. We can see that the spherical cap (55) dug into the cylinder face (51) on the piston, produces a low Surface/Volume ratio of the chamber, one that is close to that of the sphere, when the chamber volume is at a minimum (TDC).

Figure 20A:
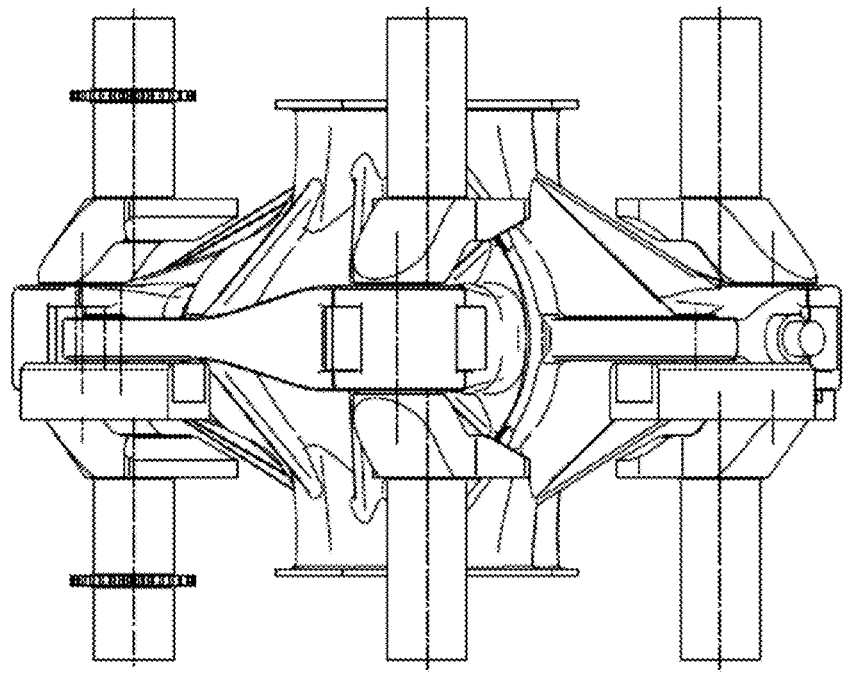
FIGS. 20a and 20b are the front and isometric illustrations of the same partial cylinder of the motor, consisting of all four sliders and moving parts that comprise the piston and crankshaft.
Figure 20B:
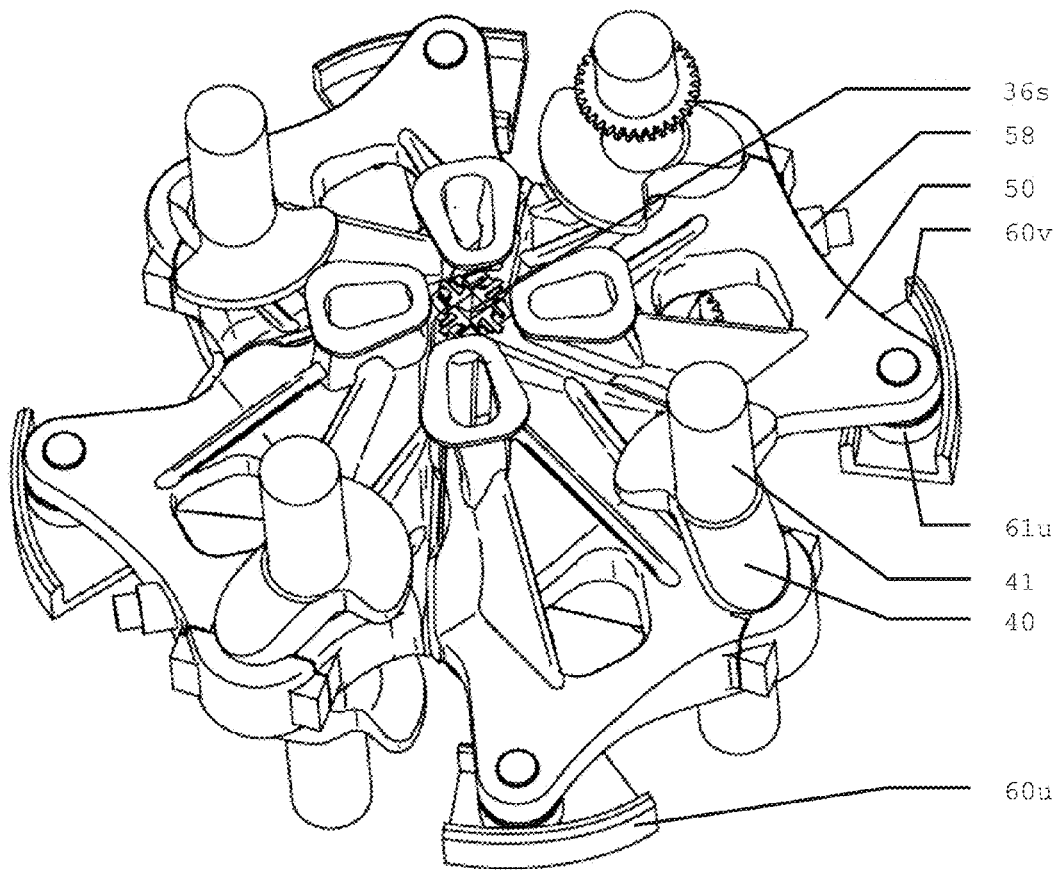

FIGS. 20a and 20b show, at the Bottom Dead Center of the cycle, the same cylinder, a partial one but one that has the four attached sliders and their flanks (60u, 60v), in which the rollers (61u) roll, and four moving parts, each one of which consists of a piston (50) and a crankshaft (40) whose bearings (41) are visible. We can also note here the upper cap (36s), of the chamber, as seen from the outside of the chamber.

Figure 21:
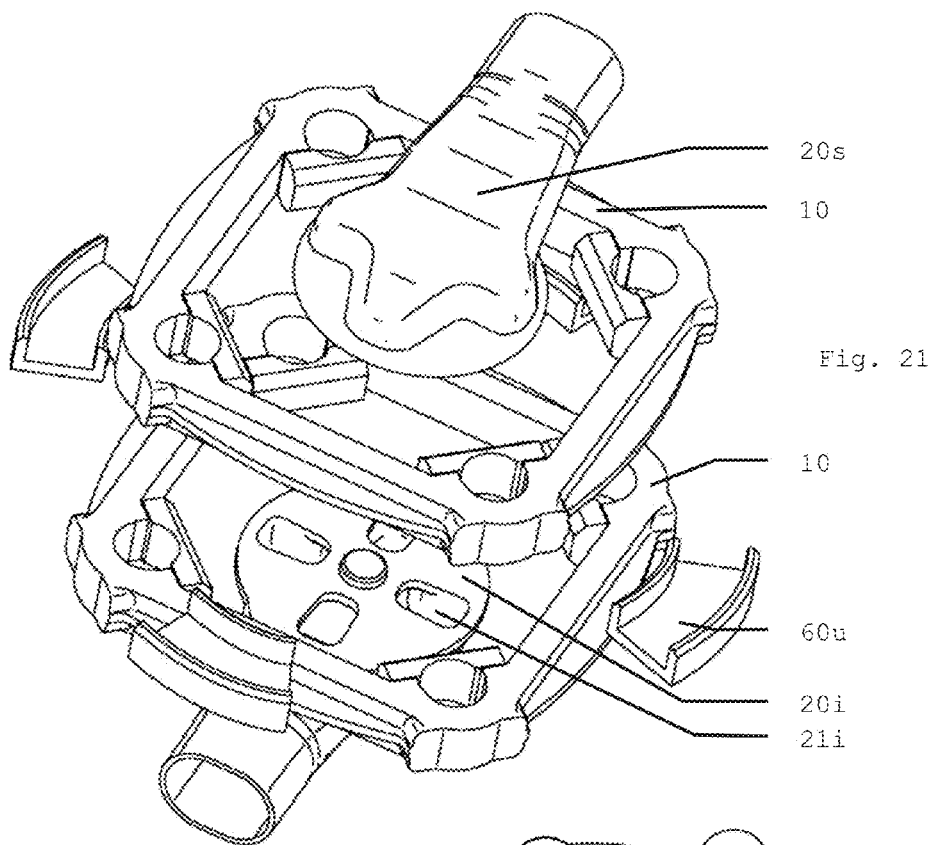
FIG. 21 shows an isometric view of the fixed components of a cylinder of the motor according to the invention.

FIG. 21 shows, for one cylinder, the fixed components, connected to the chassis assembly, here namely 4 sliders (60u), the upper intake manifold (20s) and the lower intake manifold (20i), on which the 4 apertures (21i) can be seen, the crankshaft mounting frame (10) which is in the shape of two frames (a lower frame and an upper frame), which are structural elements because they support the forces transmitted by the crankshafts at their 2 times 4 journal bearings.

The figure does not restrict the invention:
it could comprise 2 times 4 sliders (60u) if the pistons were double roller or sliding component pistons.

The fixed components are not shown connected to each other, which is not the case in reality but is simplified for explanation and illustration purposes. In reality, a housing would connect all these components to each other and would also be removable, as suggested in the drawing of the crankshaft mounting frame (10) by the slots in the crankshaft journal bearings, even if in reality these slots did not make it possible to mount the motor because they are oriented inwards.

An engine housing according to the invention may be in 2 parts, with cutaway plane in the middle, perpendicular to axis Z for a single-cylinder or passing through axis Z of the motor and the axes of 2 opposing crankshafts, or passing through axis Z and between the axes of the crankshafts for a multicylinder, or other.

Figure 22:
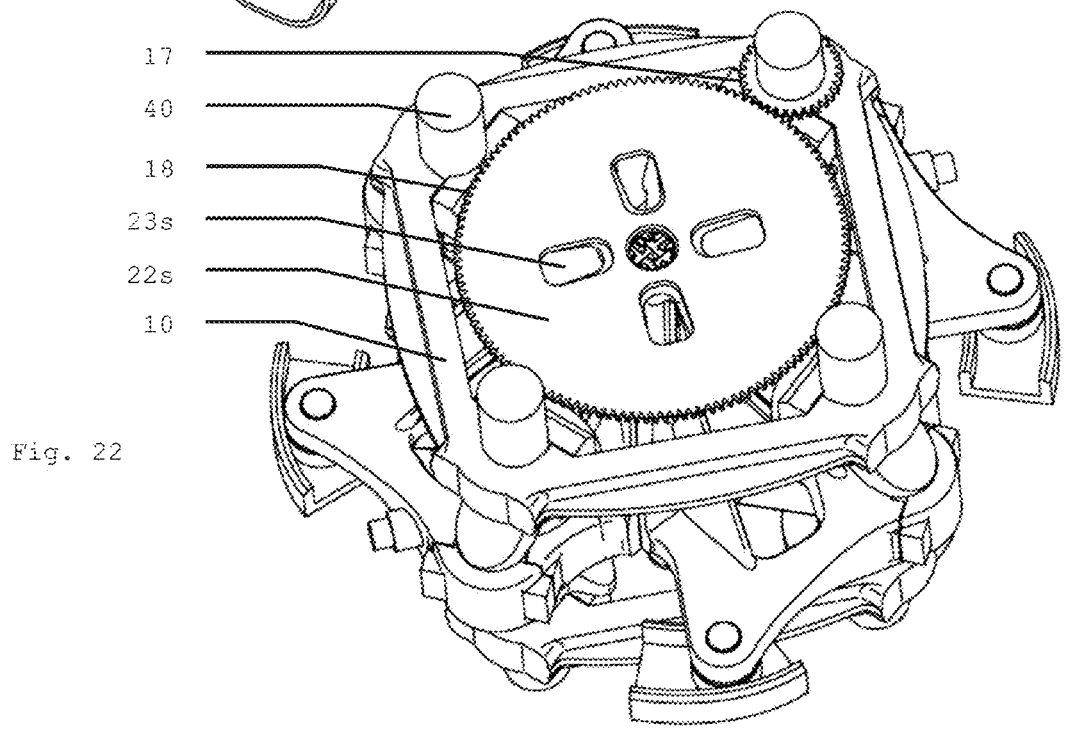
FIG. 22 is an illustration of the assembled components that comprise FIGS. 20a, 20b and 21, without the intake manifolds.

FIG. 22 shows an almost complete cylinder. We can note, in relation to FIGS. 20b and 21, the addition of the upper rotary plate (22s) with its four apertures (23s), driven via its toothed gear (18) by the rotary plate drive pinion (17).

Figure 23A:
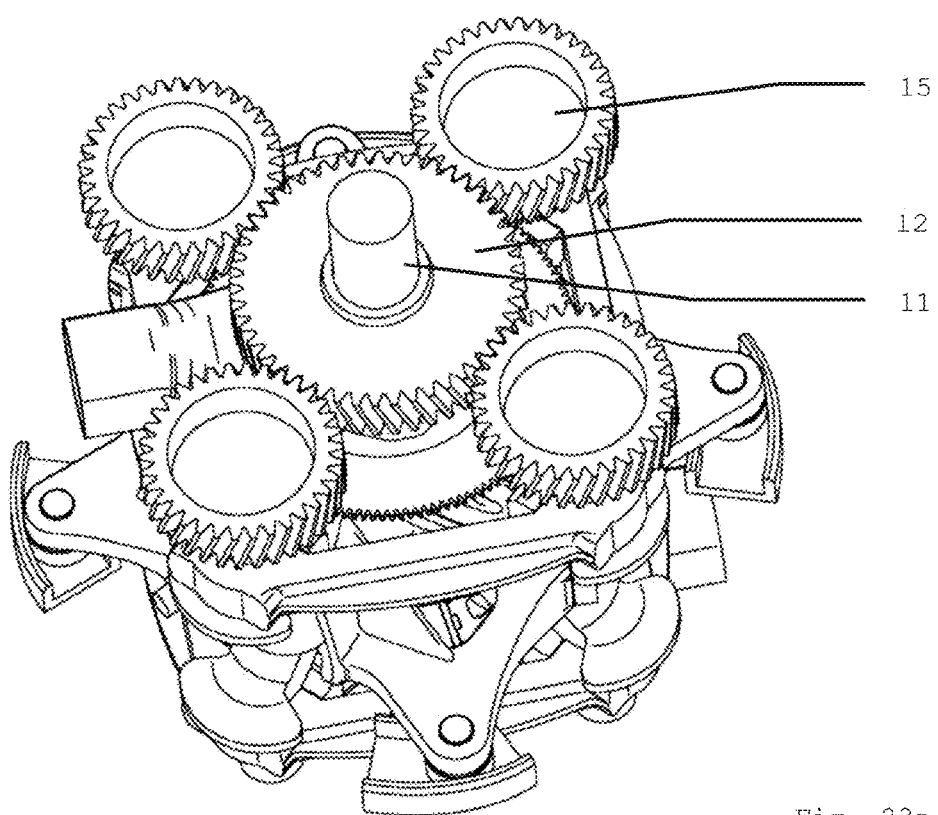
FIGS. 23a and 23b show an isometric perspective view of a single-cylinder motor.
Figure 23B:
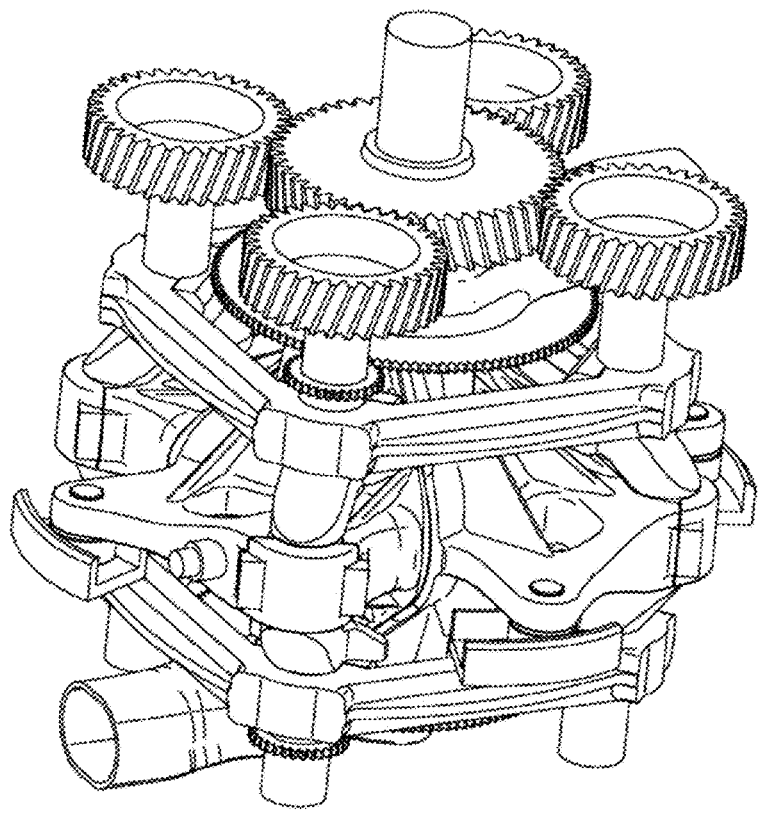

FIGS. 23a and 23b show a complete assembly of the components that comprise a single-cylinder motor according to the invention. Of course, these two FIGS. 23a and 23b do not limit the invention, for the single-cylinder of which they show the main components. Fastening hardware, enclosure housings, electric power and gasoline supply lines in the injectors and/or spark plugs etc. are not shown.

With regard to the 7 previous figures, they show the synchronization device and output shaft (11) of the motor, which, through its wheel (12), enmeshes the four satellites (15), each of which turns a crankshaft.

These two figures also show the compactness of the single-cylinder motor.

Figure 24A:
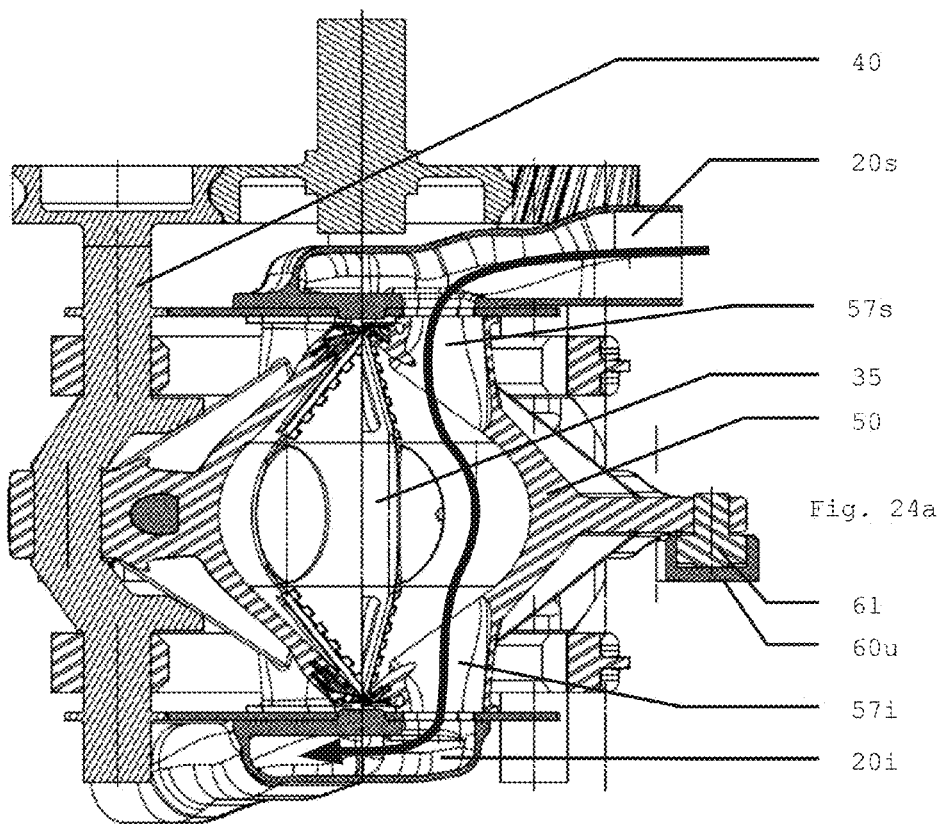
FIGS. 24a and 24b, illustrate, in a cross-sectional view that is broken by the axis of the motor, a complete single-cylinder at two different instants in the cycle.
Figure 24B:
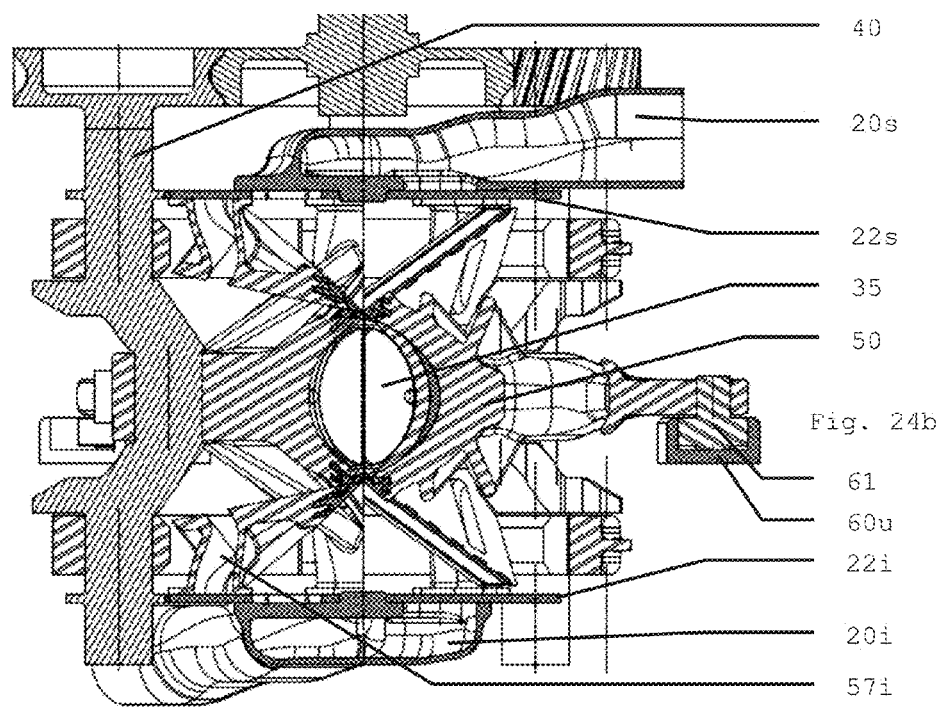

FIGS. 24a and 24b, illustrate, in a section view, the complete single-cylinder of the two preceding FIGS. 23a and 23b, a specific embodiment of the invention, at two different points in the cycle, respectively at Bottom Dead Center and at Top Dead Center. They complete FIG. 16 on the distribution.

The section view is cut vertically through axis Z of the motor. This way, at left, the plane of the section view, cuts through a crankshaft (40) and at right, cuts through a roller (61) in its slider (60u).

The thick black arrow in FIG. 24a represents the path of the gases, and shows the intake of fresh gases into chamber (35) through the intake manifold (20s) and the upper transfer units (57s), and the exhaust from burned gases in chamber (35) through the lower transfer units (57i) and the lower intake manifold (20i), which distinguishes a chamber known as an equicurrent or unidirectional scan.

FIG. 24b makes it possible to appreciate the compactness of chamber (35), its quasi-spherical shape at Top Dead Center. Here we can also note that the rotary plates (22s and 22i) close the apertures of the intake manifolds and the transfer units (57i, 57s) of pistons (50).

These two FIGS. 24a and 24b do not limit the invention. In fact, since they are pressed against the intake (20s) and exhaust manifolds (20i), one of the two rotary plates (22s or 22i) may feature a pressure support mechanism that is in contact with transfer plates (64) for the pistons and differential expansion compensation plates. This support mechanism would thicken one of the two rotary plates.

These four FIGS. 23a, 23b, 24a and 24b, do not represent the pivot connection that holds the output shaft (11) to a fixed component of the engine, for reasons of simplification and clarity. This connection is, in reality, of course, indispensable, as shown in FIG. 6b.

Laser Lighting

Figure 25:
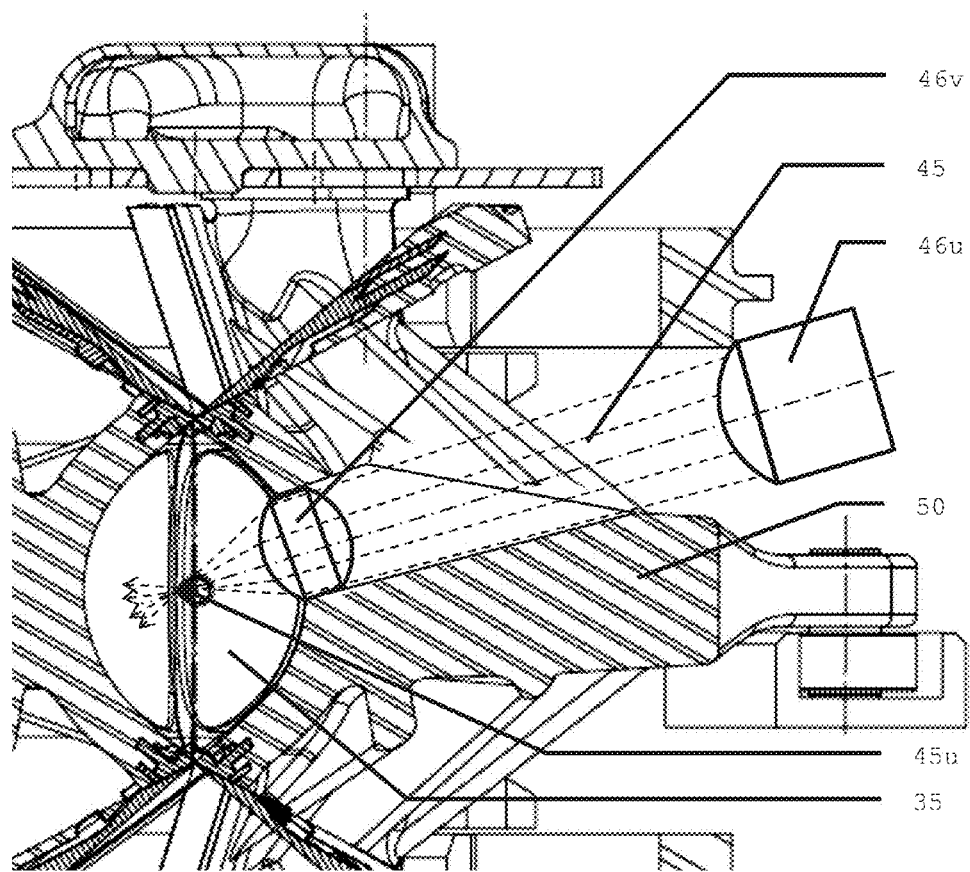
FIG. 25 illustrates, in a cross sectional view of a cylinder at Top Dead Center, a particular embodiment of the motor using ignition by laser ray.

FIG. 25 illustrates in a section view of a cylinder at Top Dead Center, a specific embodiment of the motor according to the invention, using ignition by laser ray. Here, the laser ray is emitted by a first optical sub-device (46u), one that is fixed and consisting therefore of the laser source and directing its rays (45) towards a second optical device (46v), whose attachment to the moving piston (50) of course maintains the leakproofness of chamber (35) and of which one optical face emits into the chamber and focuses the ray into a point (45u) located as close as possible to chamber (35), at an instant in the cycle that slightly precedes the Top Dead Center. The ideal optical alignment of the two optical sub-devices (46u, 46v) is obtained at around this instant of the cycle, when ignition of the laser source occurs.

In one specific manner of functioning of the motor according to the invention, when partially loaded, where the chamber retains at least 40% of the residual gases emanating from the preceding cycle, the focalization point (45u) could still be located as close as possible to axis Z of the motor, but higher in the chamber (35), and therefore intake side, in order to be sure of igniting the fresh gases admitted.

Layouts of the Boosted Engine and Multicylinders

All of the figures, from FIG. 26 to FIG. 30, show possible and specific arrangements of the motor according to the invention, of the single-cylinder to four cylinders with different boosting devices being possible, without being exhaustive.

The booster device is typically comprised, on the intake side, of at least one compressor, as a non-exhaustive example of the centrifuge or volumetric type with meshing lobe rotors or vanes or axial, etc. and/or exhaust side of at least one expansion machine, for example, not exhaustive, of a turbine, axial, centripetal type, volumetric or piston machine, etc. These expansion and compression machines, which are driving or being driven by a mechanical connection with the shaft of the motor (mechanical compound), in direct contact or via reducer relative to fixed reduction or via transmission with continuous variation or in direct contact with each other as in the standard turbocompressor or at least by a motor or electric generator (electric compound).

Figure 26:
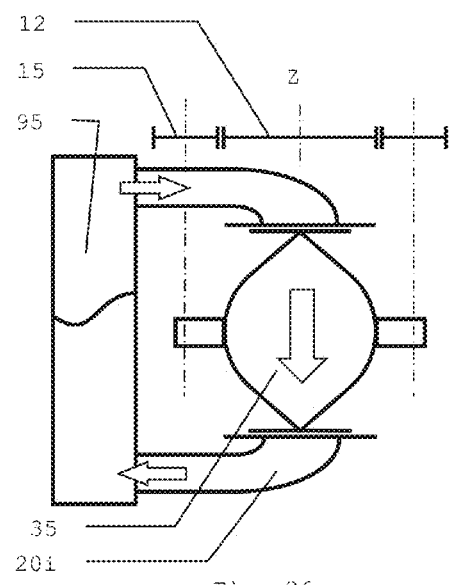
FIG. 26 shows a sketch of a single-cylinder motor with its power booster.

FIG. 26 is a schematic illustration of a single-cylinder engine with its power booster. Here, the illustration of the single-cylinder is simplified to the extreme, symbolized by this diamond shape, with 2 square corners located on axis Z of the engine and the two other rounded corners, to symbolize the chamber in section view, and two pistons symbolized by the two lateral squares. Gas sweeps through the chamber in the direction of the arrow: the fresh gases are admitted through the top, the burned gases escape out the bottom. The pistons are connected to the lines of the crankshaft, of which 2 are indicated by their axis (99) indicated in FIG. 27, and driven via their satellite (15) that meshes onto the wheel (12) connected to the output shaft. The intake and exhaust manifolds (20i) are indicated and connected to the booster device (95), which is generic here, using arrows.

These symbols are also used for the following figures, from FIG. 27 to FIG. 30, where they represent the same components.

Figure 27:
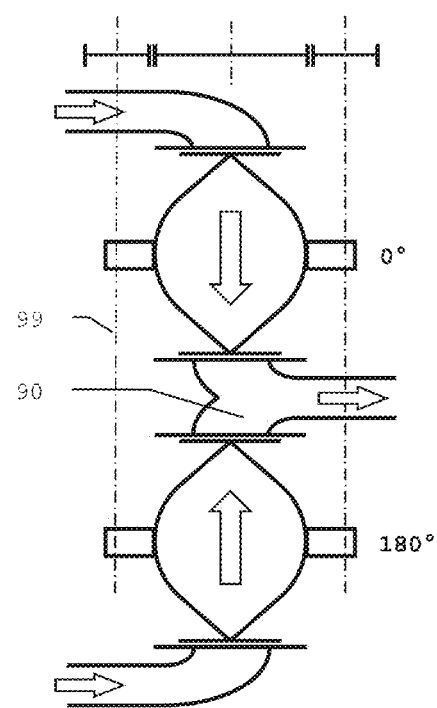
FIG. 27 shows a sketch of a bicylinder motor with a specific layout for its exhaust.

FIG. 27 shows a sketch of a bicylinder motor, without booster shown, and with a specific arrangement of its exhaust. The indications 0° and 180° indicate the relative phasing of the crank pin angles of the same crankshaft for a cycle, here a two-stroke cycle, on a 360° crankshaft rotation. The two cylinders are therefore of opposite phases.

Upon reading the direction of the arrows in their chamber, the upper cylinder escapes downwards whereas the lower cylinder escapes upwards, and their exhaust intake manifolds have been fused into a single intake manifold called a 2-to-1 exhaust manifold (90).

Figure 28:
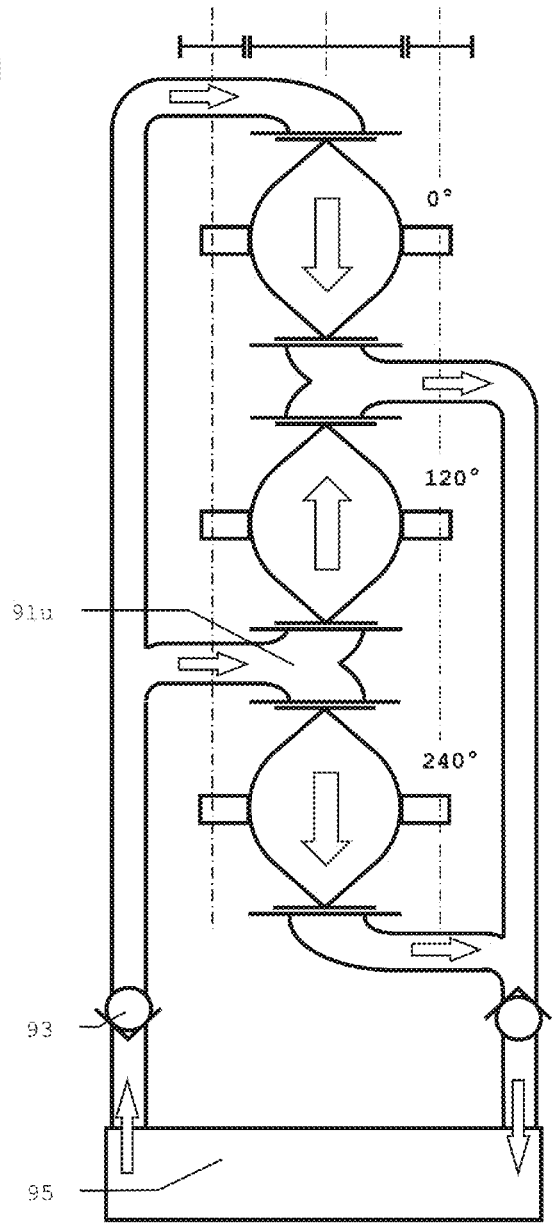
FIG. 28 shows a sketch of a three-cylinder supercharged motor with specific manifold tubes.

FIG. 28 shows a sketch of a three-cylinder engine, phase shifted from each other by one-third of a cycle upon reading the angle indications: 0°, 120° and 240°, with motor boosted and with specific manifolds. We find here a 2-to-1 exhaust manifold and, by the same principle, a 1-to-2 intake manifold (91u). Check valves (93) appear at the intake, as at the exhaust, which must, if the engine is operating in the Miller-Atkinson cycle, permit pumping when the engine is started up, in order to supply the chambers with fresh gas, without having to use a volumetric or electric compressor, which are absent from the power booster device (95), which would then consist only of a standard turbo-compression, rotating freely, with one or more stages in series or in parallel . . . .

Figure 29:
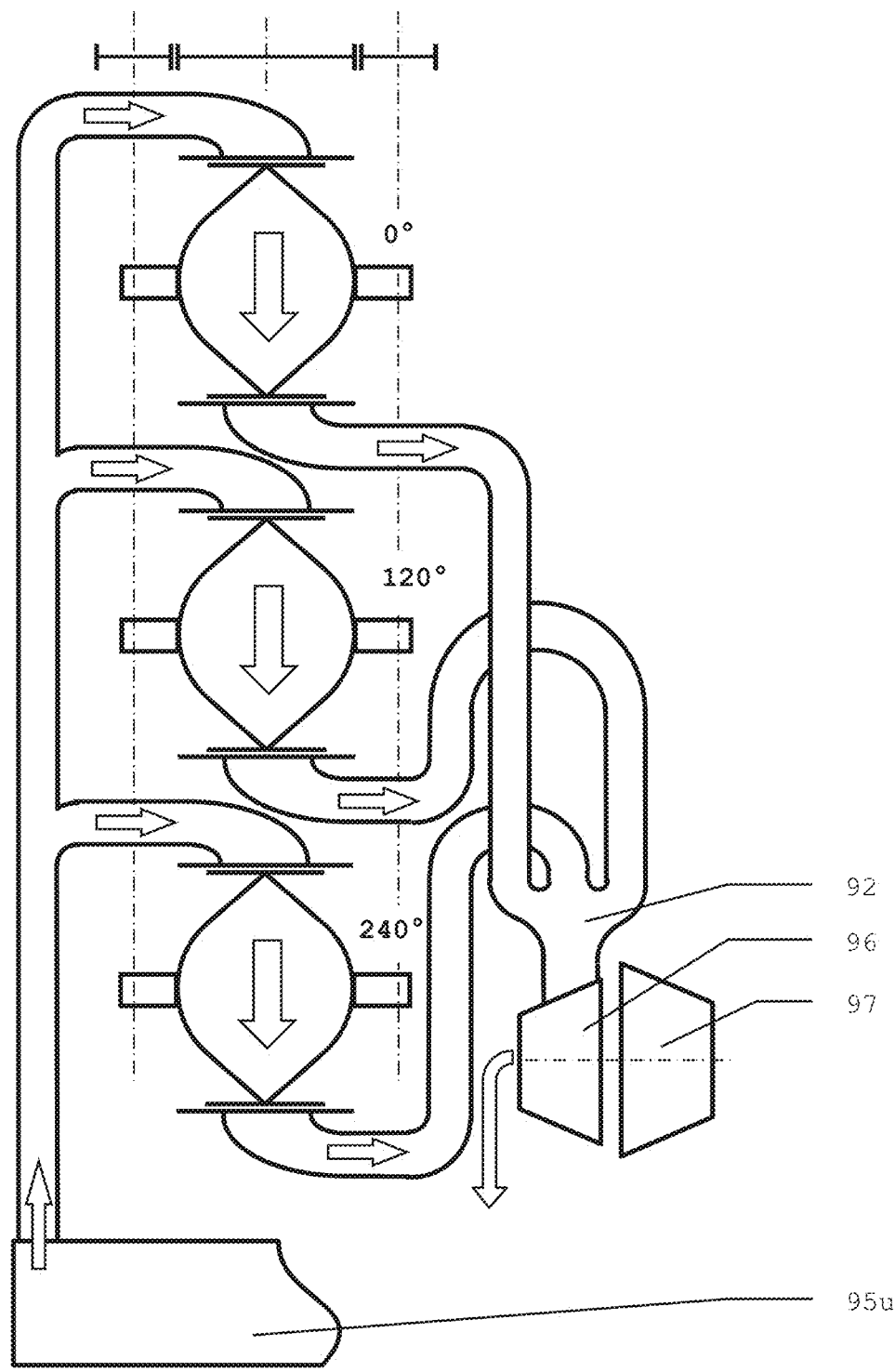
FIG. 29 shows a sketch of a supercharged three-cylinder motor with a specific arrangement of its exhaust manifold tubes.

FIG. 29 shows a sketch of a boosted three-cylinder engine where the exhaust manifolds are arranged to form a manifold called a three-in-one exhaust manifold (92) where each of the three manifolds in the exhaust manifold connected to the connection in front of the turbine (96), shows the same length or the same volume, in order to enable a connection or a regulation between the 3 cylinders, with the exhaust pressure waves at the turbine intake (96).

This turbine (96), which drives a compressor (97), therefore becomes part of the booster device, and so is partially shown on the intake side (95u). The intake is in the shape of a rake, and is not original.

Figure 30:
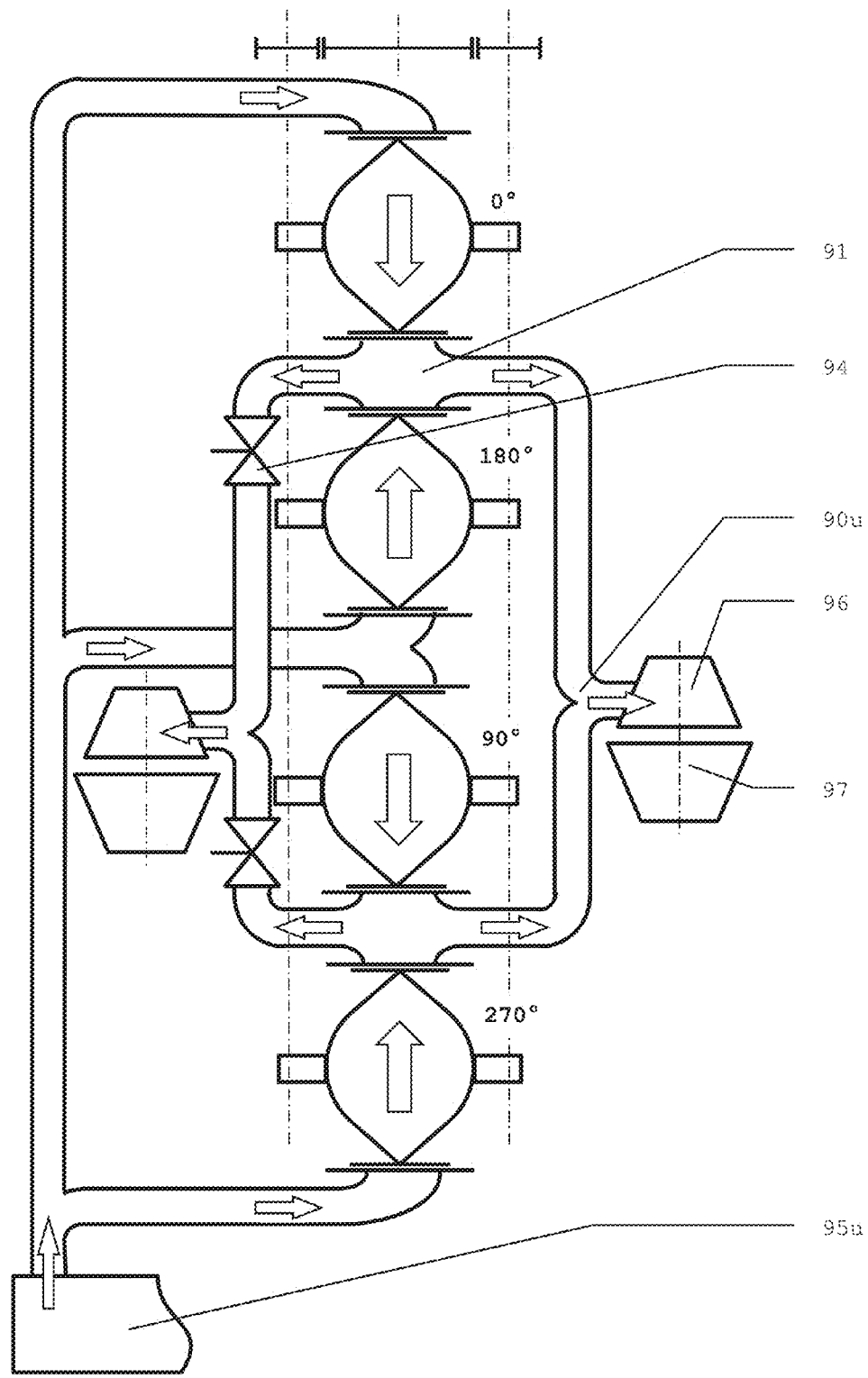
FIG. 30 shows a sketch of a four-cylinder engine that is supercharged and with a specific arrangement of its intake manifolds and intake and exhaust manifold tubes, as well as its two turbocompressors.

FIG. 30 shows a sketch of a boosted four-cylinder engine. Here, the adjacent cylinders operate at opposite phasers, with 0°/180° and 90°/270° phase shift, and their exhausts are grouped in pairs, two by two using intake manifolds called 2 by 2 exhaust intake manifolds (91). The exhausts are then grouped into manifolds called 2-by-1 exhaust manifolds (90u), with each one supplying one turbine (96). Also, these transfer units have valves (94) which all close on the same side, i.e. the two branches of one 2 by 1 exhaust transfer unit (90u) supplying the same turbine (96), make it possible, during operation at medium or partial load of the motor, to concentrate the exhaust gases on half of the turbo-compressors, in order to preserve their efficiency.

The intake is a standard one, in the shape of a rake with just one 1 by 2 intake manifold in the center, which comes from the boosting system which is partially shown (95u).

Anti-Tipping Dynamic Balancing

Figure 31:
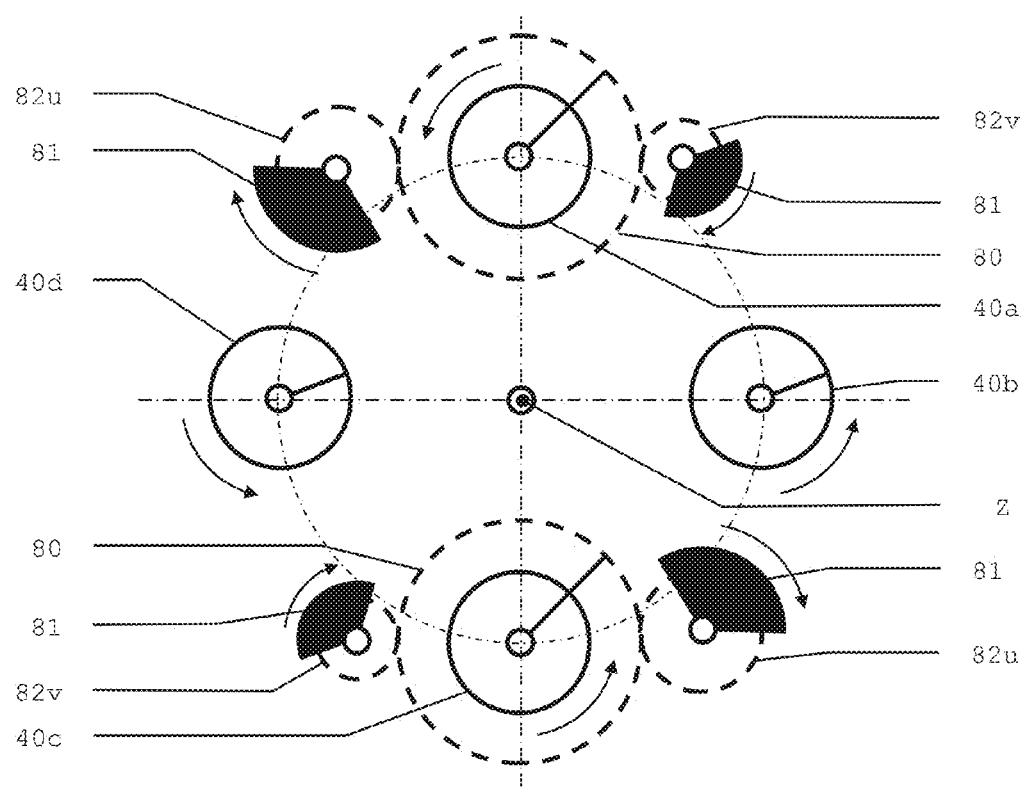
FIG. 31 shows a balancing device for harmonics 2 and 3 of the motor.

FIG. 31 shows a balancing device for harmonics 2 and 3 of the tipping moment of the motor according to the invention, along axis Z. In fact, due to its arrangement, in repetitive circles, of N swaying piston assemblies and N crankshafts, about an axis Z, the motor is statically balanced along the axis Z, but dynamically shows a moment called the tipping moment along axis Z, due to the inertia of the moving parts in motion, as well as the fluctuation of the engine moment on the output shaft. In order to fully balance this inertial tipping of the motor, the rotation harmonics 2, 3, 4, etc. (which are variable depending on N) along axis Z need to be cancelled or attenuated; these harmonics are naturally generated by the swaying movement of the pistons. Since the harmonic 1 or fundamental can be balanced in the standard manner using counterweights on the crankshafts or by simple cancellation using two cylinders.

This FIG. 31 shows the cancellation of the harmonic 2, by a layout, which here is two unbalancing masses (81), diametrically opposed relative to axis Z of the motor, turning in the same direction, but in opposite phases, by meshing gears via the drive pinion of the unbalancing mass of harmonic 2 (82u), with the two gears driving the unbalancing mass (80), each of which is integral to one of the two diametrically opposed crankshafts (40a and 40c). Due to the double ratio of the pitch circle perimeters of the gear driving the unbalancing mass (80) on that of the drive pinion of the unbalancing mass on harmonic 2 (82u), the unbalancing mass thus turns at a speed that is double that of the crankshafts, which corresponds to harmonic 2. This speed is doubled, on average per half-cycle, but could fluctuate with a drive pinion on the unbalancing mass on harmonic 2 (82u) to the non-circular pitch circle, in order to better adjust the attenuation of the vibrations by eventually reducing the unbalancing masses of the higher harmonics.

In order to cancel harmonic 3, the same principle is used with a pair of imbalance weight drive pinions (82v) on harmonic 3, which turn 3 times faster than the same two crankshafts that drive them.

This FIG. 31 is only one illustrated example of a specific embodiment of the invention, which does not limit the possible embodiments of this type of balancing device of the invention, a device that is not indispensable, especially in systems with three or more cylinders. Instead of one pair of diametrically opposed unbalancing masses, the invention may have four unbalancing masses that are equally distributed about axis Z of the motor, for the same harmonic, and driven by four as by two crankshafts.

Acyclism

Each cyclic drive and orientation mechanism (30) consists of at least one drive shaft (39) in continuous, monotone rotation. Here the continuous, monotone rotation is understood to be like all alternating heat engines: dependent upon load, speed, number of cylinders, etc. at a speed considered to be constant, with the crankshafts and the output shaft rotating acyclically.

Lubrication/Cooling Device

This device is not excessively more specific than on any other standard engine or rotating-piston Wankel engine, if only because an exclusively-liquid oil cooling is simpler than water cooling, because oil or the oil cycle is already present for lubrication.

According to one particular manner of embodiment of the invention, the oil is fed in the standard manner through the bearings of the crankshaft crank pins, near the chamber surfaces through various channels in the piston.

For the firebreak surface version of the piston assembly, the cooling conduits around the combustion chamber may be arranged as close as possible in the firebreak surface or otherwise in the sliding/friction interface between the face and the piston or inside the piston.

The oil may then be evacuated, preferably by centrifuging, from the edges of the piston assembly towards the housing/chassis, ideally according to an ejection plan, perpendicular to axis Z of the motor, which does not breach the face apertures of the piston assemblies, so that lubricant does not get into it.

Exhaust transfer units may include cooling fins.

SUMMARY OF THE INVENTION

To this end, the primary subject is an alternating internal combustion engine, having a fixed chassis assembly that consists of at least one elementary assembly called a cylinder, of specified center O on an axis Z of the motor, with the cylinder consisting of:

A whole number N, where N is greater than or equal to 3, of moving couplings likewise distributed at regular rotating intervals about axis Z of the motor, with each moving coupling consisting of at least the following components:

A piston assembly, consisting of at least:
a cylinder face (51), a surface that is ruled all over and generally concave according to a sliding axis W referenced relative to the piston assembly, an axis around which it is bent into a curve, with this axis being perpendicular to axis Z of the motor;
a sliding surface (52) whose intersection with one edge of the cylinder face (51) is an edge line, called the front edge (53), and
a sealing device comprising the sliding surface (52).

A cyclic drive and orientation mechanism (30), consisting of at least one drive shaft (39), in cyclic and monotone rotation, which drives and positions the piston assembly relative to the chassis assembly, according to a motion in a plane P that is perpendicular to axis Z of the motor.

Cylinder in which the sliding surface (52) of the piston assembly of rank M, slides with contact on a sliding segment (48u) of cylinder face (51) of the piston assembly of rank M−1, called the adjacent and surrounding piston assembly, of the piston assembly of rank M called the adjacent and surrounding piston assembly, and the sliding surface of the first piston assembly (52a) slides with contact on a sliding segment of cylinder face (51d) of the piston assembly of rank N, with M being a whole number taking values from 1 to N, where the N cylinder faces (51a, 51b, 51c, . . . ) of the N piston assemblies, and each of which defines, all by themselves, at the closest sealing device to each other, about the center O of the cylinder, a working volume known as the chamber (35), At all times in a cycle, all of the front edges N (53) of the N piston assemblies, cross in an upper cap (36s) and a lower cap (36i) located on axis Z of the motor, on either side of center O of the cylinder, During one cycle, the volume of chamber (35) reaches at least one minimum at the instant in the cycle known as the Top Dead Center and at least one maximum at the instant in the cycle known as the Bottom Dead Center, At the Top Dead Center, the volume of chamber (35) is outlined by the N portions, called the combustion sections (48v), the cylinder faces (51a, 51b, 51c, . . . ) of the N piston assemblies, with these combustion sections (48v) being adjacent to the sliding sections (48u), Cylinder consisting of a distribution device, which, during one cycle, handles exhaust, intake and confinement of the gases in the chamber (35), The engine consisting likewise of at least one synchronization device, which synchronizes, in frequency and phase, the N drive shafts (39) of the N cyclic drive and orientation mechanisms (30), depending on their distribution in rotation about axis Z of the motor, for the same cylinder and synchronization device acting for each cylinder of the motor.

In one specific embodiment of the invention, we have, for the cyclic drive and orientation mechanism (30):

The drive shaft (39) in cyclical rotation is one section of a crank arm of a single crankshaft (40), whose shaft (41) pivot in the crankshaft mounting frame (10), about an axis parallel to axis Z of the motor and whose crank pin (42), with axis parallel to the shaft (41), pivots inside the piston assembly, constituting a piston assembly drive mechanism, It kinematically connects each piston assembly to the adjacent and surrounding piston assembly, by a connection slider (32) with a trajectory that is substantially a geometry of the sliding surface (48u) of the cylinder face (51) of the surrounding piston assembly.

In a preferred embodiment of the invention, in contrast to the previous case, we have, for the cyclic drive and orientation mechanism:

The drive shaft (39) in cyclic rotation is one section of a crank arm of one single crankshaft (40), whose shaft (41) pivot inside the crankshaft mounting frame (10), about an axis parallel to axis Z of the motor and produces a continuous, monotone rotation, of one revolution per cycle and whose crank pin (42), which has an axis that is parallel to shaft (41), pivots inside the piston assembly, forming a piston assembly drive mechanism;

It consists of an orientation mechanism (31) for the piston assembly that connects it to the chassis assembly.

In a preferred embodiment of the invention, based on the previous case, the orientation mechanism (31) of the piston assembly is a kinematic connection known as a pivot slider, defined by a liaison slider between a slider (60u) with a specified, fixed slider trajectory (60) that is physically connected to the chassis assembly and between a moving component (61), which is moveable along the full length of the said slider (60u) and pivots via a pivot connection known as a pivot slider (62) on the piston assembly about an axis that is parallel to axis Z of the motor, with the said slider trajectory (60) being curved and flat, in a plane that is perpendicular to axis Z of the motor.

In a preferred embodiment of the invention, especially so in the previous case, the moving component (61) is part of the unit consisting of:

a roller (61u), which rolls inside the slider (60u) that is physically in the shape of a groove, depending on the direction of contact with one or the other of the slider flanks (60v) of this groove, and whose spacing holds the roller (61u) with minimum play, with the roller's axis being the pivot slider (62).

a sliding shoe (61v), which slides inside the slider (60u) physically in the shape of a groove, against the slider flanks (60v) in this groove, and whose spacing holds the said shoe with minimum play, and which pivots depending on the pivot slider (62) on the piston assembly.

a rolling shoe (61w), if equipped with rollers (61x), rolls inside the slider (60u) which is physically in the shape of a groove, against the slider flanks (60v) in this groove, and whose spacing holds the said rolling shoe (61w) with minimum play, and which pivots depending on the pivot slider (62) on the piston assembly.

A sliding and rolling shoe, a combination of the two preceding points, equipped with rollers (61x) that are positioned so that they assure rolling contact with only one side against only one slider flank (60v), and ensure sliding of the other side against the other slider flank.

In one specific embodiment of the invention, based on the two previous cases, we have, for axis Z of the motor, taken as coordinate origin (x=0 mm; y=0 mm):

Where the axis of the 4 crankshafts (40) is at a distance that is substantially a*84 mm from axis Z of the motor. Two of the crankshaft axes are located on the X-axis and two on the Y-axis, and the coordinates of the points hereinafter are expressed on these axes Where the crankshaft crank pins are eccentric by substantially a*16.3 mm The orthogonal distance between the axis of the piston pivot (50) with the crank pin (42) and its front edge (53) is substantially a*56.1 mm The distance between the piston pivot (50) with the crank pin (42) and the pivot slider (62) is substantially a*86.7 mm.

The slider trajectory (60) is the most regular curve possible, and passes substantially as closely as possible to the 5 coordinate points:
1. (X=a*69.4; Y=a*95.8)
2. (X=a*77.2; Y=a*91.8)
3. (X=a*85.0; Y=a*85.3)
4. (X=a*92.8; Y=a*76.0)
5. (X=a*100.7; Y=a*62.2)

In a preferred embodiment of the invention, based on all the previous cases, for each cylinder, the distribution device consists of an intake device and an exhaust device, which are distinct from each other, such as:

Each intake or exhaust device consists of at least the following:
- an intake manifold (20s) or exhaust manifold (20i), that are rigidly connected to the chassis assembly, and having a flat face that is perpendicular to axis Z of the motor, on the side of center O of the cylinder;
- a rotary plate (22), that is flat, thin and perpendicular to axis Z of the motor, at a quasi-fixed distance from center O, and driven in rotation about axis Z of the motor, in one direction or the other, at a mean rotational speed of an Nth of a revolution per cycle using a rotary plate drive mechanism (22), and having, of its two flat faces perpendicular to axis Z of the motor, a first flat face sliding against the flat face of the intake manifold (20);

For each intake or exhaust device, the intake manifold (20) and the rotary plate (22) each comprise N apertures (21, 23) of a specified shape, distributed at regular rotating intervals about axis Z of the motor, making it possible to open and close the passage from the rotary plate (22) to intake manifold (20), via their apertures (21, 23), depending on the instant in the cycle, Each intake or exhaust device consisting, in each piston assembly, of two transfer conduits (57): an exhaust transfer unit (57i) and an intake transfer unit (57s), whose end that is furthest from center O of the cylinder consists of a flat edge, called the transfer plate (64), which is perpendicular to axis Z of the motor, and sliding over the second flat face of rotary plate (22), with transfer units (57) being connected during a time period that is specified during the course of the cycle, at an instant that is close to the Bottom Dead Center:
- On the same side as transfer unit (57), transfer unit connected to the opening of one of the N apertures in rotary plate (22),
- In the other side of transfer unit (57), during a second specified period during the course of the cycle, transfer unit (57) is therefore connected to chamber (35), via an intake aperture (56s) or an exhaust aperture (56i), judiciously designed and placed on sliding surface (48u) of the cylinder face (51) of the piston assembly, through the passage and positioning in front of this aperture of sliding surface (52) of the adjacent piston assembly that slides on this sliding surface (48u) of cylinder face (51).

In one specific embodiment, based on the previous case, rotary plate drive mechanism (22) is a gearing of which one toothed gear has an axis of rotation that is axis Z of the motor and which is integral to rotary plate (22), known as the rotary plate toothed gear (18), and which meshes with this gear; either directly or via an intermediate pinion with phasing that may be adjustable using a phase shifter arranged in the said rotary plate drive mechanism (22); the toothed pinion is integral to and coaxial with crankshaft (40), known as the rotary plate drive pinion (17).

In one specific embodiment of the invention, based on the two previous cases, at least one intake or exhaust device comprises a second thin, flat plate, known as the additional plate (24), which is fastened but adjustable, inserted doubly sliding according to two planes that are perpendicular to axis Z of the motor, between the rotary plate (22) and the intake manifold (20), such that, by the variation of its angular position about axis Z of the motor and the specific shape of its N apertures (25), which are distributed at regular rotating intervals about axis Z of the motor, in which the instants of opening and/or closing of the passages of transfer units (57) to intake manifold (20) may be sooner or later in the cycle of the motor, thus creating a variable distribution.

In one very specific manner of embodiment of the invention, based on the three previous cases, the cylinder face (51) of the piston assembly is equipped, for the intake apertures (56s) and/or the exhaust apertures (56i), of an aperture shutoff device, consisting of at least one plate known as an aperture shutoff (65) which closes transfer unit (57) adjacent to this aperture, throughout the entire phase in which transfer unit (57) does not connect to chamber (35).

In one very specific embodiment of the invention, based on the four previous cases, the distribution device, through the specified shape of the apertures in the intake and exhaust devices, implements the Miller-Atkinson cycle, otherwise known as a distribution diagram where the effective expansion volume (88v) is greater than the effective compression volume (88u).

In one specific embodiment, for any one of the preceding configurations, the synchronization device for the N cyclic drive and orientation mechanisms consists of an output shaft (11) of axis Z of the motor, consisting of at least one toothed gear (12) (or pinion) having for axis the axis Z of the motor, which meshes with N toothed pinions (or gears) known as satellites (15), each of which is rigidly connected or made of drive shaft (39) or crankshaft (40) material and coaxial.

In this latter case, we have, coaxial to output shaft (11), a second output shaft known as the contra-rotational shaft (11v), i.e. one that rotates in the opposite direction of the output shaft (11) and which surrounds it, and therefore which pivots along axis Z of the motor, comprising a toothed crown gear (13), that meshes inside, with N other satellite pinions known as additional satellites (16), each of which is rigidly connected or made of drive shaft (39) or crankshaft (40) material and coaxial.

In one specific embodiment, for any one of the preceding configurations, the cylinder face (51) of at least one of the N piston assemblies has a sliding surface (48u) that has a shape that is a part of the surface generated by the scan according to a straight translation of sliding axis W of a profile of piston face (54), contained in a plane, that is generally concave about center O of the cylinder.

In an embodiment based on this latter case, the profile of piston face (54) is in the shape of a "V" with a rounded point, generating a sliding surface (48u) of cylinder face (51) which is a part of a ruled surface consisting of two flat surfaces, which connects, in tangential continuity, a section of cylinder with axis parallel to sliding axis W.

In one specific embodiment, for any one of the preceding configurations, the cylinder face (51) of at least one of the N piston assemblies has a combustion section (48v) that comprises, in its central area and up to close to its edge, a section of a cap that is substantially spherical or ovoid, known as a spherical cap (55), which is concave about center O of the cylinder, which, applied N times on the N piston assemblies, forms a chamber (35) at the Top Dead Center that is generally spherical or ovoid and whose principal axis of revolution is axis Z of the motor and center axis is center O of the cylinder, In one embodiment in particular, for any one of the preceding configurations, the cylinder face (51) of at least one of the N piston assemblies, has a combustion section (48v) that comprises, in its peripheral area adjacent to front edge (53), i.e. in its central zone where the chamber caps (36s and 36i) do not shift, a bulge (55u), a shape whose surface skims the cylinder face (51) of the adjacent and surrounding piston assembly without touching it, and moves slightly away from the front edge (53), partially obscuring it.

In a preferred embodiment, for any one of the previous cases, the piston assembly is comprised:
Of a piston (50), consisting of:
  The half-pivots outside of the pivot of the crank pin (42) of crankshaft (40) and of the pivot slider (62) of moving component (61), with axis pivots that are parallel to axis Z of the motor,
  Almost the entire surface of cylinder face (51) of the piston assembly,
  Each transfer unit (57), for intake (57s) and exhaust (57i), affixed to piston (50) or integral to it.
Of the sealing device consisting of sliding surface (52) of the piston assembly, with the front edge (53) of the piston assembly and the far end of the cylinder face (51) of the piston, therefore, adjacent to the front edge (53) at least on the sections of the upper and lower edges (53s and 53i) where the upper and lower caps of chamber (36s and 36i) shift, connected to the piston by a slider-type kinematic connection, enabling the translation of the sliding surface (52), the front edge (53) and the section of cylinder face (51) that is not connected to the piston, with translation along sliding axis W.

In one specific embodiment, based on the preceding embodiment, the sealing device is comprised:
Of an edge segment (75) consisting of:
  the entire front edge (53) of the piston assembly,
  a part of the sliding surface (52) that is adjacent to the entire length of the front edge (53)
  the border of the cylinder face (51) of the piston assembly, adjacent to the segments of the upper (53s) and lower (53i) edges of the front edge (53),
  the said edge segment (75) is kinematically connected to piston (50), by being held in a piston groove (50), creating a slider-type kinematic connection that permits only straight translation of sliding axis W relative to piston (50) and which presses this latter onto the cylinder face (51) of the other piston facing it, i.e. the piston (50) of the adjacent and surrounding piston assembly, using a spring device
two labyrinth seals (76), one upper (76s) and one lower (76i), each of which is arranged along or substantially parallel to the upper edge section (53s) and lower edge section (53i) of the front edge (53), where each segment supports the trajectory of one of the chamber caps, upper (36s) or lower (36i), where each labyrinth seal (76):
  is defined over an elongated area and merges with the cylinder face (51),
  is in contact in the corner with the edge segment (75), by enabling it to translate linearly according to a direction that is parallel to the portion of the upper (53s) or lower edge (53i),
  is pressed against this edge segment (75), using a spring device,
  has relief grooves (77) over its entire length, which correspond and fit together with minimum play with grooves made in piston (50), permitting translational motion, in the direction of the fitting.

In a very specific manner of embodiment, based on the preceding embodiment, the sealing device also consists of one or more secondary section(s) (78), such as:
  its shape corresponds substantially with the shift in edge segment (75) over sliding surface (52)
  it comprises a part of sliding surface (52), which is not adjacent to front edge (53), but which is close over the entire length of the front edge (53)
  it/they is/are in contact (in contact by block), with edge segment (75), at least in the upper edge (53s) and lower edge (53i) sections, and establishing, with this edge segment (75), sliding surface (52)
  it is kinematically connected to piston (50), by being held in a piston groove, creating a slider-type kinematic connection that permits only the translation of sliding axis W relative to piston (50) and which presses this said secondary segment (78) onto cylinder face (51) of the other piston facing it, i.e. of piston (50) of the adjacent and surrounding piston assembly, using a spring device.

In one specific embodiment, based on any one of the preceding embodiments, except for the last three, the piston assembly is comprised of:
  a piston (50), consisting of the outside half-pivots of the pivot of crank pin (42) of crankshaft (40) and of the pivot slider (62) of moving component (61), with these pivots having axes that are parallel to axis Z of the motor
  A firebreak surface (68), consisting of cylinder face (51), sliding surface (52), front edge (53) and transfer units (57), and which could cause, relative to piston (50), a guided straight translation motion via a liaison slider (69) with axis parallel to sliding axis W, of low amplitude, by sliding or rolling, with sliding surface (52), consisting of at least one groove substantially translated from front edge (53), a groove which accommodates a secondary segment (78), for sealing and/or scraping, with its means of pressure retention along sliding axis W;
  A pressure retention device for the firebreak surface (68) of the piston assembly number N, of its sliding surface (52), on the cylinder face (51) of the firebreak surface (68) of the adjacent and surrounding piston assembly number N−1, consisting of one or more springs (70), functioning substantially in the sliding axis W between piston (50) and firebreak surface (68);
  An anti-acceleration device (71) that makes it possible to almost completely cancel the inertial force subjected to by the firebreak surface (68) during its cyclic swaying movement, a device which consists of at least one anti-acceleration lever (71u) such that it:

Comprises a counterweight (71w) at its end, that brings its center of gravity perpendicular to the direction of axis Z of the motor, from the center of gravity of the firebreak surface (68);

Pivots about an axis perpendicular to sliding axis W relative to piston (50);

Drives, through its opposite end, by a drive connection (71x), the firebreak surface (68) in its relative translational movement along sliding axis W, with a force multiplier lever arm, with a multiplier ratio equal to the mass ratios of the mass of the firebreak surface (68) divided by the mass of the anti-acceleration lever(s) (71u) with its counterweight(s) (71w).

In one specific embodiment, based on any of the previous cases, consisting of a number K of cylinders, with K being greater than or equal to 2, where the K times N drive shafts (39) or crankshaft sections (40) of each of the N moving parts of the K cylinders, are oriented parallel to axis Z of the motor so that they are N times coaxial, and are synchronously driven and out of phase with the number K of cylinders and therefore form a number N of identical drive shafts or identical crankshafts (40), for each one about an axis called the crankshaft line (99), with crankshafts then consisting of K crank pins (42) out of phase by 360°/K if it is a 2-stroke engine or 720°/K if it is a 4-stroke engine.

In one specific embodiment, based on the previous case, two intake manifolds (20) of the same type (intake or exhaust) of adjacent cylinders are paired 2 by 2, because they are likewise adjacent because these two cylinders have opposite directions along axis Z of the motor, with gas scan flow in their chamber (35) at around the instant of Bottom Dead Center and have at least one intake or exhaust manifold. These paired intake manifolds are called 1-to-2 intake manifold (91u), 2-to-1 exhaust manifold (90) and 2-to-2 exhaust manifold (91).

One specific embodiment, based on any of the preceding configurations, comprises at least one direct injector or ignition spark plug (58), mounted on a piston (50) or a piston assembly and mounted leak-proof, with the injector head or the ignition spark plug expelling into chamber (35) through an orifice (58w) in the cylinder face (51) of the piston assembly, expelling systematically onto the combustion section of the cylinder face (51) for one spark plug and an ignition motor compression injector.

In one specific embodiment, based on the previous case, the direct injector (58) is of the injection pump type (58v), controlled by an injection control device, and driven by the crankshaft (40) or the drive shaft (39) of the same piston assembly where this said crankshaft (40) comprises a cam (43) on its crank pin (42) and behaves like a cam shaft at the front, for a cylinder head whose role here is played by piston (50) or the piston assembly, which then comprises a mechanism for activating the compression of the injection pump (58v), an activating mechanism that could consist of an injector lever (44).

In one specific embodiment, based on any one of the previous cases, at least one cylinder has at least one laser ignition system, by focusing its laser ray (45) in chamber (35) by means of an optical device that admits the wavelength of the said laser, one face of which is located on the combustion section of cylinder face (51) of a piston assembly, laser ignition system, distinguished by one or more components from the following group:

The focal point of the laser ray (45u), i.e. the ignition point, is located near the center of chamber (35), i.e. the center O of the cylinder, at the instant of ignition by laser impulse, an instant that is a little before the Top Dead Center The optical device consists of two optical sub-devices, the second optical sub-device (46v), attached to piston (50) or piston assembly and the first optical sub-device (46u) located on the chassis assembly, attached and comprising the laser source. The laser ray that travels from the first optical sub-device (46u), fixed then through the second, moveable optical sub-device (46v), with the two sub-devices being separated by the void that separates the piston assembly from the chassis assembly or motor housing, with the two optical sub-devices being positioned aligned relative to each other in a manner that is optically acceptable at the instant in the cycle when the laser impulse occurs.

The optical device, as well as the laser source, is located on the piston assembly. The electric power line for the laser source is flexible and runs from the chassis assembly attached to the mobile piston assembly.

One specific embodiment, based on any one of the previous cases, comprises at least one dynamic balancing device, consisting of at least two imbalancing masses (81) arranged at regular rotating intervals balanced about axis Z of the motor, pivoting according to axes that are parallel to axis Z of the motor, with each one driven in rotation by gearing with a drive shaft (39) or crankshaft (40), via a gear driving the imbalancing mass (80) that is integral to the crankshaft and via an imbalancing mass drive pinion (82u or 82v, depending on the harmonic) connected to imbalancing mass (81), at an average speed, of the same frequency as the harmonic of the inertial swinging moment along axis Z of the motor that needs to be attenuated.

A specific embodiment, based on any one of the previous cases, is equipped with a booster device (95) consisting of one or more components, and which may or may not be combined or identical and redundant from the following group:

A volumetric compressor at intake, driven mechanically with a fixed ratio by the motor's output shaft (11);

A volumetric compressor or centrifuge, driven electrically;

A compression housing, connected to the chassis assembly and entrapping, for each cylinder, the volume around the piston assemblies, in which the intake gas passes before intake manifold (20s) and where compression occurs when the volume of chamber (35) increases;

A single turbocompressor, where compressor (97) compresses the intake cycle gas, and where turbine (96) expands the exhaust gases;

A turbocompressor, whose mechanical shaft is connected directly to an electric motor-generator;

A turbocompressor, whose shaft is connected mechanically to a reducer at the motor's output shaft;

A compound mechanical turbine, i.e. mechanically connected to the motor's output shaft.

A turbineless exhaust, in particular for a single-cylinder motor according to the invention.

A booster air radiator, for cooling the gases admitted into the motor after a compression stage.

An exhaust gas recirculation loop, which removes a fraction of exhaust gases to reintroduce them into the intake gases, An exhaust gas recirculation radiator, for cooling the fraction of admitted gases coming from exhaust gases.

Valves (94) for closing at least one exhaust branch upstream from an exhaust circuit turbine, consisting of multiple turbines in parallel.

A specific embodiment, based on the previous cases, is such that it consists of at least two cylinders and whose booster device (95) consists of at least one turbocompressor and check valves (93) in the intake and exhaust cycles and does not include a volumetric compressor.

In one specific embodiment, based on any of the previous cases, each piston assembly is cooled by the lubrication oil, circulating under pressure, via at least one canal arranged in crankshaft (40), and reaching the level of the crank pin bearing (42) and then traveling through multiple channels, inside of piston (50), up to the vicinity of the hot walls that are the combustion sections (48v) and sliding sections (48u) of cylinder face (51) of the piston assembly as well as the exhaust transfer unit (57i) and then, after the oil has been ejected into the space surrounding the piston assemblies and crankshafts (40), enclosed inside a motor housing connected to the chassis assembly.

In one specific embodiment, a device from the following group:
- A land-based, marine or air vehicle,
- A moto-propulsion unit consisting of a shaft in direct contact or a rotor,
- Moto-propulsion unit consisting of two contra-rotating coaxial shaft in direct contact,
- A hybrid traction chain, in series or parallel, whose heat engine is an electric or pneumatic or hydraulic hybrid,
- A cogeneration device consisting of at least one second Rankine cycle thermodynamic motor,
- An electric power generator, A device, as equipped with a heat engine according to any one of the preceding characteristics.

NOMENCLATURE OF THE MOTOR

Parts are considered to be upper and lower, for ease of illustration. This does not set the orientation of the motor in any way. By convention:

s=Upper=intake/i=Lower=exhaust, for a single-cylinder. A multicylinder may include inversions.

Suffixes a, b, c, d, . . . designate the N different components from the kinematic groups, preferably 4 in number.

Suffixes u, v, w, x designate a nearby component.

| N° | Description of components and assemblies/Remarks |
|---|---|
| 10 | Crankshaft mounting frame/shown by 2 separate frames that are connected to the chassis assembly |
| 11 | Output shaft |
| 11v | Contra-rotating shaft |
| 12 | Gear |
| 13 | Crown gear |
| 15, 15a, 15b, 15c, 15d, . . . | Satellite, $1^{st}$, $2^{nd}$, $3^{rd}$, $4^{th}$, . . . satellites/ Gear or pinion |
| 16, 16a, 16b, 16c, 16d, . . . | additional satellite, $1^{st}$, $2^{nd}$, $3^{rd}$, $4^{th}$, . . . additional satellite |
| 17 | Drive pinion of the rotary plate |
| 18 | Toothed gear of the rotary plate |
| 20, 20s and 20i | Intake and exhaust manifolds/fixed |
| 21, 21s and 21i | Apertures in the intake manifold, upper and lower |
| 22, 22s and 22i | Rotating plate, upper and lower |
| 23, 23s and 23i | Aperture(s) in the rotary plate, upper (intake) or lower (exhaust) |
| 24 | Additional plate |
| 25 | Mouth(s) of the additional plate |
| 30 | cyclic drive and orientation mechanism/of the piston assembly |
| 31 | orientation mechanism/of the piston assembly |
| 32 | Liaison slider |
| 35 | Chamber/Working volume |
| 36s and 36i | Upper and lower caps/of the chamber |
| 39 | Drive shaft |
| 40, 40a, 40b, 40c, 40d, . . . | Crankshaft, $1^{st}$, $2^{nd}$, $3^{rd}$, $4^{th}$, . . . crankshafts |
| 41 | Propeller |
| 42 | Crank pin/Pivot axis of the crank pin |
| 43 | Cam/of the injection pump |
| 44 | Injector lever/or, here, a roller rocker arm |
| 45, 45u | Laser ray, focal/ignition point |
| 46u | First optical sub-device |
| 46v | second optical sub-device/of the laser lighting optical device |
| 48u | Sliding surface/Section of the cylinder face, supports the sliding |
| 48v | Ignition section/Section of the cylinder face, ignition indicator |
| 50, 50a, 50b, 50c, 50d, . . . | Piston, $1^{st}$, $2^{nd}$, $3^{rd}$, $4^{th}$, . . . pistons |
| 51 | Cylinder face/of the piston assembly or piston |
| 51a, 51b, 51c, 51d, . . . | Cylinder face of the $1^{st}$, $2^{nd}$, $3^{rd}$, $4^{th}$, . . . piston assembly/or piston |
| 52, 52a, 52b, . . . 52d, . . . | Sliding surface/of the piston assembly, sliding surface of the $1^{st}$ piston assembly, sliding surface of the $2^{nd}$ piston assembly, . . . sliding surface of the $4^{th}$ or Nth piston assembly, etc. |
| 53, | Front edge of the piston assembly, |
| 53s et 53i | Upper and lower segment edges/where the upper and lower caps shift |
| 54, 54u | Piston face profile, rounded profile |
| 55 | Spherical cap |
| 55u | Bulge |
| 56s et 56i | Intake and exhaust apertures |
| 57, 57s et 57i | Transfer, intake transfer unit and exhaust transfer/channel for |
| 58, | Direct injector or ignition spark plug, |
| 58v, | Injector pump |
| 58w | orifice/associated expelling into the chamber |
| 59u, 59v and 59w | Position of the front edge of the adjacent face of the adjacent surrounded piston assembly: at Bottom Dead Center, upon opening or closing of the aperture and at the Top Dead Center |
| 60 | Slider trajectory |
| 60u, 60v | Slider, slider flank/or groove |
| 61, 61u, 61v, 61w, 61x | Moving component, roller, sliding shoe, rolling shoe, rolling shoe roller |
| 62 | Pivot slider/between the moving component in the slider and piston |
| 64 | Transfer plate |
| 65 | Aperture shutoff device/here, the upper one |
| 68 | Firebreak surface |
| 69 | Connection between the slider/firebreak surface and piston, with sliding axis W |
| 70 | Pressure retaining spring |
| 71 | Anti-acceleration device |
| 71u | Anti-acceleration lever(s) |
| 71v | Lever pivot |
| 71w | Counterweight/of the lever |
| 71x | Drive connection/of the firebreak surface by the lever |
| 75 | Edge segment/fire-break |
| 76, 76s, 76i | Labyrinth seal, upper and lower |
| 77 | Grooves/of the labyrinth seal |
| 78 | Secondary segment/of sealing or scraper |
| 80 | Gear driving the imbalancing mass/toothed |
| 81 | Imbalancing mass |
| 82u | Drive pinion for harmonic imbalancing mass 2 |
| 82v | Drive pinion for harmonic imbalancing mass 3 |
| 85s, | Angular range of the intake opening between chamber and transfer unit, angular range of the intake opening between transfer unit and intake manifold |
| 86s | |
| 85i, | Angular range of the exhaust opening between chamber and transfer unit, angular range of exhaust opening between transfer unit and intake manifold |
| 86i | |
| 87 | Chamber volume curve |

-continued

| N° | Description of components and assemblies/Remarks |
|---|---|
| 88u | Effective compression volume/Stroke |
| 88v | Effective expansion volume/Stroke |
| 88w | Expansion over-volume |
| 90 | 2-to-1 exhaust manifold |
| 90u | 2-to-1 exhaust manifold |
| 91 | 2-to-2 exhaust manifold |
| 91u | 1-to-2 intake manifold |
| 92 | 3-to-1 manifold tubes/of the same length |
| 93 | Check valve/intake or exhaust |
| 94 | Valve |
| 95, 95u | Booster device, partial/diagrammed |
| 96 | Turbine/in turbocompressor |
| 97 | Compressor/in turbocompressor |
| 99 | Crankshaft line |
| o | Center of cylinder |
| Z, Z−, Z+ | Axis Z of the motor, 2 positions of axis Z/variable during the cycle, relative to piston |
| W | sliding axis W |
| — | Chassis assembly/Fixed component to which the other fixed elements are connected (not shown) |
| — | Piston assembly/2 different explicit types |

The invention claimed is:

1. A two-stroke alternating internal combustion heat engine, comprising:

a chassis assembly comprising a crankshaft mounting upper frame (10) and a crankshaft mounting lower frame (10);

sliders (60), each slider (60) having opposite slider flanks (60v, 60u) that define a curved slide channel, each slider being stationary;

a mobile component (61) that slides in each slider along a trajectory defined by the curved slide channel;

a motor output shaft (11) extending coaxially with a first axis (Z), the first axis (Z) extending through the crankshaft mounting upper frame (10) and the crankshaft mounting lower frame (10);

an elementary assembly having a center (O) located on the first axis (Z), the elementary assembly being comprised of at least three moving piston-slider-crank assemblies that are distributed at equal-distant angular intervals about the first axis (Z), the at least three moving piston-slider-crank assemblies including a first moving piston-slider-crank assembly, a second moving piston-slider-crank assembly, and a third moving piston-slider-crank assembly, each moving piston-slider-crank assembly including a piston (50), a crankshaft (40), a sealing device (75, 78), and one of the sliders (60), the piston (50) of each moving piston-slider-crank assembly comprising an internal cylinder face (51) having a front edge (53), the sealing device (75, 78) being located in an area of the front edge (53) of the piston (50) and providing a sliding surface area (52) during movement of the piston-slider-crank assembly, the internal cylinder face (51) of the piston (50) being a concave surface, the concave surface being a ruled surface, the concave surface extending in the sliding direction (w) of each moving piston-slider-crank assembly, the concave surface being curved around the center (O) of the elementary assembly, the internal cylinder face (51) of the piston (50) being divided into a sliding surface (48u) adjacent to a combustion section (48v), wherein the mobile component (61) is connected to the piston (50) at a pivot point and, during movement of each piston-slider-crank assembly, movement of the mobile component (61) and an axis of the pivot point is along the trajectory of the curved slide channel of the slider (60), wherein, for each moving piston-slider-crank assembly, the piston (50) is i) driven in rotation by the crankshaft (40) and ii) driven in a sliding movement by the movement of the mobile component (61) sliding along the trajectory of the curved slide channel of the slider (60), wherein the sliding surface area (52) provided by the seal device (75, 78) of each piston (50) of each moving piston-slider-crank assembly interlock by contact with the internal cylinder face (51) of the piston (50) to encase a volume during a cycle, the volume defining a combustion chamber (35) having a quasi-spherical shape at top dead center, the volume of the combustion chamber (35) being variable during the cycle and being a minimum volume at top dead center and at a maximum volume at bottom dead center, wherein the crankshaft (40) of each moving piston-slider-crank assembly extends along a different respective axis parallel to the first axis (Z), the crankshaft (40) of each moving piston-slider-crank assembly extending through both the upper frame (10) and the lower frame (10);

a cyclic drive and orientation mechanism (30) connected to each moving piston-slider-crank assembly, each cyclic drive and orientation mechanism (30) comprising a drive shaft (39), moving in cyclic and monotone rotation, which drives and positions the piston relative to the crankshaft mounting upper frame (10) and a crankshaft mounting lower frame (10) according to a movement in a plane (P) that is perpendicular to the first axis (Z), wherein when the at least three moving piston-slider-crank assemblies includes exactly three moving piston-slider-crank assemblies, i) the sealing device (75, 78) of the piston of the first moving piston-slider-crank assembly slides in contact on the sliding surface (48u) of the internal cylinder face (51) of the piston of the second moving piston-slider-crank assembly, ii) the sealing device (75, 78) of the piston of the second moving piston-slider-crank assembly slides in contact on the sliding surface (48u) of the internal cylinder face (51) of the piston of the third moving piston-slider-crank assembly, and iii) the sealing device (75, 78) of the piston of the third moving piston-slider-crank assembly slides in contact on the sliding surface (48u) of the internal cylinder face (51) of the piston of the first moving piston-slider-crank assembly, wherein at all times in the cycle, the front edge (53) of each piston (50) crosses in an upper cap (36s) and a lower cap (36i) located on the first axis (Z) located on opposite sides of the center (O) of the elementary assembly, wherein at top dead center, the volume of the combustion chamber (35) is outlined by the combustion sections (48v) of the internal cylinder face (51) of the piston of the at least three moving piston-slider-crank assemblies;

a distribution device, that handles, during the cycle, exhaust, intake and confinement of gases in the combustion chamber (35); and a synchronization device, that synchronizes, in frequency and phase, the drive shaft (39) of each cyclic drive and orientation mechanism (30).

2. The heat engine, according to claim 1, wherein,
there are plural of the mobile component (61), each mobile component associated with one of the sliders,
each drive shaft (39) is connected to one of the crankshafts (40),
the curved slide channel of each slider defines a groove,
each mobile component (61) comprises:
a roller (61u) that rolls in the groove defined by the curved slide channel of the slider, according to a direction of contact on one of the slider flanks (60v) in the associated one slider (60),
a sliding shoe (61v), which slides in the associated one slider (60) against the slider flanks (60v),
a rolling shoe (61w) rolling in the associated one slider (60) against the slider flanks (60v).

3. The heat engine, according to claim 1, wherein the distribution device comprises one intake device and one exhaust device, the intake device being distinct from the exhaust device,
each intake device comprising at least the following:
an intake manifold (20) having a flat face that is perpendicular to the first axis (Z),
a rotary plate perpendicular to the first axis (Z) and driven in rotation about first axis (Z) using a rotary plate drive (22), the rotary plate having first and second flat faces perpendicular to the first axis (Z) where the first flat face slides against the flat face of the intake manifold (20),
the intake manifold (20) and the rotary plate (22) each comprising first apertures (21, 23) that are distributed at regular rotating intervals about the first axis (Z) that enable the opening and closing of a first passage from the rotary plate (22) to the intake manifold (20), via the first apertures (21, 23),
each exhaust device comprising at least the following:
an exhaust manifold having a flat face that is perpendicular to the first axis (Z),
the exhaust manifold comprising second apertures (21, 23) that are distributed at regular rotating intervals about the first axis (Z) and that enable the opening and closing of a second passage from the rotary plate (22) to the exhaust manifold (20), via the second apertures (21, 23),
two transfer units (57) that include an exhaust transfer unit (57i) and an intake transfer unit (57s) with an end furthest away from the center (O) of the elementary assembly comprising a flat edge, called a transfer plate (64), that is perpendicular to the first axis (Z), and which slides on the second flat face of the rotary plate (22), with the two transfer units (57) being connected during a period during the cycle, at an instant that is close to Bottom Dead Center:
the exhaust transfer unit (57) connecting to and with an opening of one of the apertures in the rotary plate (22);
the intake transfer unit (57) connecting with the chamber (35), via an intake aperture (56s) or an exhaust aperture (56i).

4. The heat engine, according to claim 3, wherein the rotary plate drive (22) is a gearing with a rotary plate toothed gear (18) having the first axis (Z) as a rotational axis.

5. The heat engine, according to claim 3, further comprises an additional plate (24) with plural apertures (25), which is fastened but adjustable, inserted doubly sliding according to two planes perpendicular to the first axis (Z), between the rotary plate (22) and the intake manifold (20), such that, by the variation of its angular position about the first axis (Z), and the plural apertures (25), distributed in regular rotational intervals about the first axis (Z), in which the instants of opening and/or closing of the passages of transfer units (57) to the intake manifold (20) may be sooner or later in the cycle of the motor, thus creating a variable distribution.

6. The heat engine, according to claim 3, wherein the intake device and the exhaust device, implement the Miller-Atkinson cycle where the effective expansion volume (88v) is greater than the effective compression volume (88u).

7. The heat engine, according to claim 1, wherein the synchronization device comprises a toothed wheel (12) arranged as a pinion and with an axis at the first axis (Z), and which meshes with toothed pinions arranged as satellites (15).

8. The heat engine, according to claim 7, further comprising a second output shaft coaxial to the motor output shaft (11), the second output shaft being known as a contra-rotational shaft (11v) rotating in a direction opposite that of the output shaft (11) and surrounding the output shaft (11).

9. The heat engine, according to claim 1, wherein a profile of a piston face (54) of the internal cylinder face (51) is in the shape of a "V" with a rounded point, which generates a sliding surface (48u) of the internal cylinder face (51) which is a part of the ruled surface and includes two flat surfaces, which connects, in tangential continuity, a cylinder section with an axis parallel to a sliding axis (W).

10. The heat engine, according to claim 1, wherein the combustion section (48v) of the internal cylinder face (51) comprises a central zone and a periphery, and next to the periphery a portion of a cap that is substantially spherical or ovoid, known as a spherical cap (55), which is concave about the center (O) of the elementary assembly, and at the Top Dead Center, forms the chamber (35) that is largely spherical or ovoid in shape and which has the first axis (Z) as a principal axis of revolution as a center, at the center (O) of the elementary assembly.

11. The heat engine, according to claim 1, wherein,
each piston (50) is driven directly by the crankshaft (40) via a crank pin pivot (42) and guided in rotation by a pivot slider (62) of the mobile component (61), and
each sealing device comprises the sliding surface area (52) of the piston, with the front edge (53) of the piston and a far end of the internal cylinder face (51) of the piston adjacent to the front edge (53) of the piston (50).

12. The heat engine, according to claim 11, wherein each sealing device is comprised of:
an edge segment (75) that includes:
the entire front edge (53) of the piston (50),
a section of the sliding surface area (52) that is adjacent over the entire length of the front edge (53) of the piston (50),
a border of the internal cylinder face (51) of the piston (50), adjacent to upper (53s) and lower (53i) segments of front edge (53) of the piston (50),
said edge segment (75) is kinematically connected to the piston (50), by being held in a piston groove (50), creating a slider-type kinematic connection that permits only straight translation of a sliding axis (W) relative to a first piston (50) and which presses this latter onto the internal cylinder face (51) of a second piston facing the first piston, using a spring device,
two labyrinth seals (76), one upper seal (76s) and one lower seal (76i), each one of which is arranged along or substantially parallel to the upper edge portions (53s) and the lower edge portion (53i) of the front edge (53), with each portion supporting the trajectory of one of the chamber caps, upper (36s) or lower (36i), where each labyrinth seal (76):
- is defined over an elongated area and merges with internal cylinder face (51),
- is in contact with a corner of the edge segment (75), by enabling it to translate linearly according to a direction that is parallel to a portion of upper edge (53s) or lower edge (53i),
- is pressed against this edge segment (75), using a spring device,
- has relief grooves (77) over its entire length, which correspond and fit together with minimum play with grooves made in piston (50), permitting translational motion, in the direction of the fitting.

13. The heat engine, according to claim 12, wherein each sealing device also comprises one or more secondary section(s) (78), such that:
- each sealing device's shape corresponds substantially to the shift of the edge segment (75) on the sliding surface area (52),
- each sealing device comprises a section of the sliding surface area (52), not adjacent to the front edge (53), but close to the front edge (53) over the entire length of the front edge (53),
- each sealing device is in contact, with the edge segment (75), at least in the upper edge (53s) and the lower edge (53i) sections, and establishing, with the edge segment (75) the sliding surface area (52),
- each sealing device is kinematically connected to piston (50), by being held in a piston groove, creating a slider-type kinematic connection that permits only the translation of sliding axis W relative to piston (50) and which presses this said secondary segment (78) onto the internal cylinder face (51) of the piston (50) of the adjacent and surrounding piston assembly, using a spring device.

14. The heat engine, according to claim 1,
comprising a number K of the elementary assembly, with K being greater than or equal to 2, and a number N of the drive shaft (39), where the K times N drive shafts (39) are oriented parallels to the first axis (Z), and are driven synchronous and out of phase of the number K of the elementary assembly and therefore form a number N of identical drive shafts, for each one about an axis called the crankshaft line (99), with crankshafts including K crank pins (42) out of phase by 360°/K if it is a 2-stroke engine or 720°/K if it is a 4-stroke engine.

15. The heat engine, according to claim 14, wherein two intake manifolds (20) of the same type (intake or exhaust) of adjacent elementary assemblies are paired 2 by 2, with opposite directions along the first axis (Z), with gas scan flow in each of the combustion chamber (35) at around the instant of Bottom Dead Center and have at least one intake or exhaust manifold.

16. The heat engine, according to claim 1, further comprising at least one direct injector or ignition spark plug (58), mounted leak-proof on each piston (50), with the injector or the ignition spark plug expelling into the chamber (35) by an orifice (58w) in the internal cylinder face (51) of the piston, expelling systematically onto the combustion section of the internal cylinder face (51) for one spark plug and a compression ignition motor injector.

17. The heat engine, according to claim 1, further comprising at least one dynamic balancing device that includes at least two first imbalancing masses (81) arranged at regular rotating intervals balanced about the first axis (Z), and pivoting along axes that are parallel to the first axis (Z), with each first imbalancing mass (81) being driven in rotation by gearing with the drive shaft (39) or the crankshaft (40), via a gear driving a second imbalancing mass (80) that is integral to the crankshaft and via an imbalancing mass drive pinion (82u 82v) connected to the first imbalancing mass (81), at an average speed, of the same frequency as the harmonic of the inertial swinging moment along the first axis (Z).

18. The heat engine, according to claim 1, further comprising a booster device (95) having one or more components, from the following group:
- a volumetric compressor at intake, driven mechanically with a fixed ratio by the motor output shaft (11);
- a volumetric compressor or centrifuge, driven electrically;
- a compression housing, connected to the chassis assembly and entrapping, for each cylinder, the volume around the piston assemblies, in which the intake gas passes before an intake manifold (20s) and where compression occurs when the volume of chamber (35) increases;
- a single turbocompressor, where a compressor (97) compresses the intake cycle gas, and a turbine (96) expands the exhaust gases;
- a turbocompressor, whose mechanical shaft is connected directly to an electric motor-generator;
- a turbocompressor, whose shaft is connected mechanically to a reducer at the motor output shaft;
- a compound mechanical turbine mechanically connected to the motor output shaft;
- a turbineless exhaust;
- a booster air radiator, for cooling the gases admitted into the motor after a compression stage;
- an exhaust gas recirculation loop, which removes a fraction of exhaust gases to reintroduce it into the intake gases;
- an exhaust gas recirculation radiator, for cooling the fraction of gases admitted coming from exhaust gases; and
- valves (94) for closing at least one exhaust branch upstream from an exhaust circuit turbine, comprising multiple turbines in parallel.

19. The heat engine, according to claim 18, comprising at least two of the elementary assembly, with a booster device (95) of at least one turbocompressor and check valves (93) in the intake and exhaust cycles and does not comprise a volumetric compressor.

20. The heat engine, according to claim 1, wherein each piston assembly is cooled by lubrication oil, circulating under pressure, via at least one canal arranged in the crankshaft (40), and reaching a level of a crank pin bearing (42) and then traveling through several channels, inside the piston (50), up to the vicinity of the combustion sections (48v) and the sliding sections (48u) of the internal cylinder face (51) of the piston as well as an exhaust transfer unit (57i) and then, after the oil has been ejected into a space surrounding the piston assemblies and the crankshafts (40), enclosed inside a motor housing connected to the chassis assembly.

21. The heat engine, according to claim 1, used for a device from the following group:
- a land-based, marine or air vehicle,
- a moto-propulsion unit consisting of a propeller in direct contact or a rotor,
- a moto-propulsion unit consisting of two coaxial contra-rotational propellers in direct contact,
- a hybrid traction chain, in series or in parallel, whose heat engine is a hybrid electrical, pneumatic or hydraulic, a cogeneration device consisting of at least one second Rankin Cycle thermodynamic motor, and an electric power generator.

22. The heat engine of claim 1, wherein, the at least three moving piston-slider-crank assemblies includes exactly four moving piston-slider-crank assemblies, where i) the sealing device (75, 78) of the piston of the first moving piston-slider-crank assembly slides in contact on the sliding surface (48*u*) of the internal cylinder face (51) of the piston of the second moving piston-slider-crank assembly, ii) the sealing device (75, 78) of the piston of the second moving piston-slider-crank assembly slides in contact on the sliding surface (48*u*) of the internal cylinder face (51) of the piston of the third moving piston-slider-crank assembly, iii) the sealing device (75, 78) of the piston of the third moving piston-slider-crank assembly slides in contact on the sliding surface (48*u*) of the piston of the internal cylinder face (51) of the fourth moving piston-slider-crank assembly, and iv) the sealing device (75, 78) of the piston of the fourth moving piston-slider-crank assembly slides in contact on the sliding surface (48*u*) of the piston of the internal cylinder face (51) of the first moving piston-slider-crank assembly.

23. The heat engine of claim 1, wherein, the at least three moving piston-slider-crank assemblies includes exactly five moving piston-slider-crank assemblies, where i) the sealing device (75, 78) of the piston of the first moving piston-slider-crank assembly slides in contact on the sliding surface (48*u*) of the internal cylinder face (51) of the piston of the second moving piston-slider-crank assembly, ii) the sealing device (75, 78) of the piston of the second moving piston-slider-crank assembly slides in contact on the sliding surface (48*u*) of the internal cylinder face (51) of the piston of the third moving piston-slider-crank assembly, iii) the sealing device (75, 78) of the piston of the third moving piston-slider-crank assembly slides in contact on the sliding surface (48*u*) of the piston of the internal cylinder face (51) of the fourth moving piston-slider-crank assembly, and iv) the sealing device (75, 78) of the piston of the fourth moving piston-slider-crank assembly slides in contact on the sliding surface (48*u*) of the piston of the internal cylinder face (51) of the fifth moving piston-slider-crank assembly, and v) the sealing device (75, 78) of the piston of the fifth moving piston-slider-crank assembly slides in contact on the sliding surface (48*u*) of the piston of the internal cylinder face (51) of the first moving piston-slider-crank assembly.

* * * * *